US007843598B2

(12) United States Patent
Tatsumi

(10) Patent No.: US 7,843,598 B2
(45) Date of Patent: Nov. 30, 2010

(54) IMAGE PROCESSING METHOD AND APPARATUS, AND IMAGE RECORDING APPARATUS

(75) Inventor: Setsuji Tatsumi, Ashigarakami-Gun (JP)

(73) Assignee: Fujifilm Corporation, Tokyo (JP)

( * ) Notice: Subject to any disclaimer, the term of this patent is extended or adjusted under 35 U.S.C. 154(b) by 331 days.

(21) Appl. No.: 12/003,932

(22) Filed: Jan. 3, 2008

(65) Prior Publication Data

US 2008/0117250 A1 May 22, 2008

Related U.S. Application Data

(62) Division of application No. 11/369,740, filed on Mar. 8, 2006, now Pat. No. 7,338,145.

(30) Foreign Application Priority Data

Mar. 9, 2005 (JP) ............................ 2005-065973

(51) Int. Cl.
*G06F 15/00* (2006.01)
*G06K 15/00* (2006.01)
*H04N 1/405* (2006.01)

(52) U.S. Cl. ........................ 358/1.2; 358/1.9; 358/3.06; 358/3.12

(58) Field of Classification Search ................. 382/254, 382/256, 258; 358/1.1, 1.2, 1.9, 3.01, 3.06, 358/3.09, 3.12
See application file for complete search history.

(56) References Cited

U.S. PATENT DOCUMENTS 6,731,398 B1 * 5/2004 Yoshizawa .................. 358/1.2
2002/0070990 A1 6/2002 Yamasaki et al.

FOREIGN PATENT DOCUMENTS

JP 2000-141709 A 5/2000
JP 2000-198237 A 7/2000
JP 2002-292848 A 10/2002
JP 2003-145744 A 5/2003
JP 2004-306392 A 11/2004

* cited by examiner

*Primary Examiner*—Thomas D Lee
(74) *Attorney, Agent, or Firm*—Birch, Stewart, Kolasch and Birch, LLP

(57) ABSTRACT

An image processing method for an image recording apparatus which records an image by means of dots on a recording medium, the image processing method includes the steps of: setting the recording medium; and forming the dots on the recording medium, wherein: dot size information relating to the dots that have at least one dot size and are recordable by the image recording apparatus, and recording resolution information are obtained; when image information for a text character or line is transformed into bitmap data which the image recording apparatus can record the image in accordance with, then dot sizes and recording positions of the dots are determined in accordance with the dot size information and the recording resolution information, in such a manner that a recording width of the text character or line approaches a recording width determined in accordance with the image information.

5 Claims, 22 Drawing Sheets

IMAGE PROCESSING METHOD AND APPARATUS, AND IMAGE RECORDING APPARATUS

This application is a Divisional of application Ser. No. 11/369,740 filed on Mar. 8, 2006 now U.S. Pat. No. 7338145, and for which priority is claimed under 35 U.S.C. §120; and this application claims priority of Application No. JP 2005/065973 filed in Japan Mar. 9, 2005 under 35 U.S.C. §119; the entire contents of all are hereby incorporated by reference.

BACKGROUND OF THE INVENTION

1. Field of the Invention

The present invention relates to an image processing method, an image processing apparatus, and an image recording apparatus, and more particularly, to technology for suppressing the thickening of text characters and lines when high density recording is carried out with an image recording apparatus such as an inkjet printer which forms an image composed of dots on a recording medium.

2. Description of the Related Art

An image recording apparatus is known which includes an inkjet head having an arrangement of a plurality of nozzles that eject ink in the form of droplets, and which eject ink droplets from the nozzles toward the recording medium while the inkjet head and the recording medium are caused to move relatively to each other so as to deposit the ejected ink droplets at appropriate positions on the recording medium, and thereby records an image on a recording medium by ink dots formed of the deposited ink droplets.

In an image recording apparatus that records images (including text characters and lines) composed of ink dots in this way, there is a possibility that ink bleeding occurs in the outline areas of the text character or line, thus giving rise to thickening of the text character and line. Consequently, the image quality may be degraded.

Considering this, various techniques have been proposed to prevent the thickening of the text character and line by suppressing ink bleeding in outline areas of the text character and line.

For example, Japanese Patent Application Publication No. 2002-292848 discloses a technique in which the number of dots or the size of dots is reduced, concerning the dots forming an outline that is parallel to the main scanning direction or the dots located inward by one row from the outline. Thereby, the volume of ink is reduced and bleeding of ink in the outline areas is suppressed.

Furthermore, for example, Japanese Patent Application Publication No. 2000-141709 discloses a technique in which it is determined whether the recording pixels in the peripheral pixels around a particular pixel are densely concentrated or not. If the recording pixels are concentrated, then recording is performed using a recording dot with a large diameter. In contrast, if the recording pixels are not concentrated (in the case of text characters or lines where the concentration is low), then recording is performed using a recording dot with a small diameter. Consequently, disruption, and the like, of the text characters are prevented, and the image is made to be sharp.

As described above, in the related art, droplets are ejected to form dots with a large diameter in order to guarantee density and suppress non-uniformities in density, in a solid section. On the other hand, in lines and text characters, or the outline areas thereof, droplets are ejected to form dots with a small diameter in order to suppress thickening of the text characters and lines.

Recently, high density recording has come to be carried out, images being written at a resolution (recording density) of 1200 dots per inch (dpi) or above and small text characters of approximately 4-point size being printed, for instance. Hence, according to these developments, there has been a demand to eject ink droplets having a small dot diameter. If the resolution is 1200 dpi, then a minimum dot diameter must be approximately 21 μm and it is necessary to eject droplets having an ink volume of less than 1 picoliter (pl), in order to make the dot diameter corresponding to the resolution. At present, however, it is difficult to achieve such a dot diameter, and the minimum dot diameter can be around 25 μm to 30 μm.

FIG. 21A shows a case where droplets are deposited to form dots of 25 μm in diameter at a high density of 2400 dpi, for example. FIG. 21A shows an ideal region where recording is expected. In FIG. 21A, the points of intersection of the alternate long and short dash lines, which extend vertically and horizontally, represent the centers of the recording dots. Since the density is 2400 dpi, the interval between the alternate long and short dash lines, which indicates the distance between the centers of the dots, is approximately 11 μm.

The square region enclosed by the solid lines in FIG. 21A indicates the ideal region where recording with the recording dots is expected, in an ideal case where the region of the square shape defined by the dotted lines is recorded with the recording dot positioned at the center of the square shape (the point of intersection of the alternate long and short dash lines). In this case, the ideal dots are square in shape.

FIG. 21B shows a case where dots having a diameter of 25 μm are recorded in such a manner that the centers of the recording dots are positioned at the points of intersection of the alternate long and short dash lines. The regions shown in FIG. 22B that are actually recorded, form a thicker line than the ideal regions where recording is originally expected as shown in FIG. 22A.

In this way, under the conditions of 2400 dpi resolution (namely, a distance between dot centers being 11 μm) and droplet deposition to form dots of 25 μm diameter, if bitmap data for text characters or lines are created on the basis of the resolution, then a thick line exceeding the width of the originally expected line is obtained. If the text characters and lines are broad, then this phenomenon is not problematic; however, in the case of small text characters of 4-point size, or the like, the text characters can become thicker and image quality can decline.

For example, a case is described below in which very small characters are recorded, so that the desired line regions close to each other, as shown by the two rectangular shapes indicated by the solid lines in FIG. 22A. Similarly to the foregoing example, droplets are deposited under the conditions of a resolution of 2400 dpi and a dot diameter of 25 μm. In this case, desirably, the interval between the two regions indicated by the rectangular shapes demarcated by the solid lines is approximately 22 μm (corresponding to 1200 dpi), as shown in FIG. 22A. However, if droplets are deposited to form dots having a diameter of 25 μm at the dot center positions, then the recorded lines become thicker than the desired line regions, and the blank area between the lines (regions) becomes extremely narrow (e.g., 10 μm or less) as shown in FIG. 22B. This leads to a corruption of the text characters, and thus causes the print quality to decline. As described above, in the above-described technology, bleeding is prevented and thickening of the lines is suppressed, by ejecting droplets to form small dots in the outline areas. However, if the minimum dot diameter is larger than the distance between the recording dots (for instance, droplets are deposited to form dots of 30

μm diameter at a resolution of 2400 dpi), then it is difficult to suppress thickening of the text characters and lines.

SUMMARY OF THE INVENTION

The present invention has been contrived in view of the foregoing circumstances, and an object thereof is to provide an image processing method, an image processing apparatus, and an image recording apparatus which can suppress the thickening of a very small text character or a very fine line which is recorded when the recorded image is composed of ink dots and the high density recording is performed. Thereby, the image quality can be improved.

In order to attain the aforementioned object, the present invention is directed to an image processing method for an image recording apparatus that records an image on a recording medium by means of dots including a dot with a minimum dot size larger than a recording distance determined in accordance with resolution, the image processing method comprising the steps of: setting the recording medium; and forming the dots on the recording medium, wherein: outline area dots are dots for recording an outline area of a text character or line which are formed by depositing the dots onto recording positions based on data of the image in a case where a recording region in which the dots are to be formed corresponds to the text character or line; a distance A represents a distance in a direction perpendicular to an ideal outline of the text character or line which is determined in accordance with the recording distance, between the ideal outline and a first envelope line of the outline area dots which extends in a direction of the ideal outline; inner adjacent dots are dots formed by depositing the dots onto recording positions which are inside the text character or line and located inward in a direction substantially perpendicular to the ideal outline by a prescribed number with respect to the outline area dots; a distance B represents a distance in a direction perpendicular to the ideal outline between the ideal outline and a second envelope line of the inner adjacent dots which extends in a direction of the ideal outline; and if relationship between the distance A and the distance B satisfies a following expression, A>B, then the inner adjacent dots are formed and the outline area dots are not formed on the recording medium.

According to this aspect of the invention, it is determined whether to deposit droplets to form dots at the outermost edge of the outline area of a text character or line or not, on the basis of the droplet deposition density (resolution), the droplet deposition size (dot size), and the ideal droplet deposition line width. Accordingly, thickening (or narrowing) of lines and disruption of their shape is prevented, and the recording (reproduction) quality of very small text characters and very thin lines recorded at high density can be improved. The envelope line does not necessary coincide with the envelope defined in strict mathematical terms. The dots recorded onto the recording medium are finite in number. In this specification, the line that makes contact with a portion of each one of the dots is called the envelope line. In concrete terms, it is specified as described below.

Preferably, the ideal outline is an envelope line of outermost perimeters of dots for recording the outline area of the text character or line which have a dot size equal to the recording distance and formed by depositing the dots onto recording positions based on data of the image.

According to this aspect, if the dot size (dot diameter) of the dots deposited and formed onto the recording positions used for recording the outline area is equal to the recording distance, and dots having a radius of ½ of the recording distance are deposited and formed so that their centers coincide with the recording positions (ideally, square dots having edges of the same length as the recording distance and centered on the recording positions), then the ideal outline is the line that passes through the positions ½ of the recording distance from the recording positions.

Preferably, the first envelope line is an envelope line of outermost perimeters of the outline area dots; and the second envelope line is an envelope line of outermost perimeters of the inner adjacent dots.

Alternatively, it is also preferable that the first envelope line is an envelope line of outermost perimeters of sections where the outline area dots overlap each other; and the second envelope line is an envelope line of outermost perimeters of sections where the inner adjacent dots overlap each other.

According to these aspects, it is possible to use a line that touches the outermost perimeter of each of the dots, and a line that touches the outermost perimeter of the overlapping portions of the dots, as prescribed envelopes for the dots that are actually deposited. A line which touches the outermost perimeters of the overlapping portions of the respective dots is used, as in the latter case, because the non-overlapping portions of the dots to the outer side of these portions have low concentration, and it is considered that the outer perimeters of the overlapping portions of the dots are recognized as the outline under actual observation by the human eye.

Preferably, if the image recording apparatus is capable of recording with a plurality of different dot sizes, the inner adjacent dots are to be formed, and the outline area dots are not to be formed, then the a dot size of each of the inner adjacent dots is set to a dot size which minimizes the distance B.

According to this aspect, if dots with a plurality of sizes can be recorded, then by selecting not only the droplet deposition arrangement but also the dot sizes in such a manner that the position of the outline approaches that of the ideal outline, thickening of lines, and the like, is prevented more effectively, and the recording quality of thin lines can be improved.

Preferably, only if the relationship between the distance A and the distance B satisfies the expression, A>B, and the text character or line with respect to a width direction corresponds to not less than two of the dots, then the inner adjacent dots are formed and the outline area dots are not formed on the recording medium.

According to this aspect, if the line width is one dot, then by preventing the elimination of this dot, it is possible to prevent the disruption of the shape of very small characters, or the like. Hence deterioration of the recording quality can be prevented.

In order to attain the aforementioned object, the present invention is also directed to an image processing method for an image recording apparatus that records an image on a recording medium by means of dots including a dot with a minimum dot size larger than a recording distance determined in accordance with resolution, the image processing method comprising the steps of: setting the recording medium; and forming the dots on the recording medium, wherein: outline area dots are dots for recording an outline area of a text character or line which are formed by depositing the dots onto recording positions based on data of the image in a case where a recording region in which the dots are to be recorded corresponds to the text character or line; a distance A represents a distance in a direction perpendicular to an ideal outline of the text character or line which is determined in accordance with the recording distance, between the ideal outline and a first envelope line of the outline area dots which extends in a direction of the ideal outline; first inner adjacent dots are dots formed by depositing the dots onto recording positions which are inside the text character or line and located inward in a direction substantially perpendicular to the ideal outline by a first prescribed number with respect to the outline area dots; a distance B1 represents a distance in a direction perpendicular to the ideal outline between the ideal outline and a second envelope line of the first inner adjacent dots which extends in a direction of the ideal outline; second inner adjacent dots are dots formed by depositing the dots onto recording positions which are inside the text character or line and located inward in a direction substantially perpendicular to the ideal outline by a second prescribed number with respect to the outline area dots, the second prescribed number being greater than the first prescribed number; a distance B2 represents a distance in a direction perpendicular to the ideal outline between the ideal outline and a third envelope line of the second inner adjacent dots which extends in a direction of the ideal outline; if distance A is the smallest of the distances A, B1, and B2, then the outline area dots are formed on the recording medium and a dot which is located at on outside of the outline area dots in an outline direction of the outline area dots does not formed on the recording medium; if distance B1 is the smallest of the distances A, B1, and B2, then the first inner adjacent dots are formed on the recording medium and a dot which is located on an outside of the first inner adjacent dots in an outline direction of the first inner adjacent dots does not formed on the recording medium; and if distance B2 is the smallest of the distances A, B1, and B2, then the second inner adjacent dots are formed on the recording medium and a dot which is located on an outside of the second inner adjacent dots in an outline direction of the second inner adjacent dots does not formed on the recording medium.

According to this aspect of the invention, by gradually moving the droplet deposition candidate position in a plurality of stages toward the inner side from the outline area, it is possible to improve the recording quality of very small text characters, and the like, more effectively.

Preferably, the ideal outline is an envelope line of outermost perimeters of dots for recording the outline area of the text character or line which have a dot size equal to the recording distance and formed by depositing the dots onto recording positions based on data of the image.

Preferably, the first envelope line is an envelope line of outermost perimeters of the outline area dots; and the second envelope line is an envelope line of outermost perimeters of the first inner adjacent dots the third envelope line is an envelope line of outermost perimeters of the second inner adjacent dots.

Alternatively, it is also preferable that the first envelope line is an envelope line of outermost perimeters of sections where the outline area dots overlap each other; the second envelope line is an envelope line of outermost perimeters of sections where the first inner adjacent dots overlap each other; and the third envelope line is an envelope line of outermost perimeters of sections where the second inner adjacent dots overlap each other.

In order to attain the aforementioned object, the present invention is also directed to an image processing method for an image recording apparatus which records an image by means of dots on a recording medium, the image processing method comprising the steps of: setting the recording medium; and forming the dots on the recording medium; wherein: dot size information relating to the dots that have at least one dot size and are recordable by the image recording apparatus, and recording resolution information are obtained; if image information for a text character or line is transformed into bitmap data which the image recording apparatus can record the image in accordance with, then dot sizes and recording positions of the dots are determined in accordance with the dot size information and the recording resolution information, in such a manner that a recording width of the text character or line approaches a recording width determined in accordance with the image information.

According to this aspect of the invention, by taking the droplet deposition size as well as the droplet deposition density into account in developing vector data into raster data (bitmap data), it is possible to improve the quality of thin lines of very small text characters recorded at high density.

Preferably, the at least one dot size are larger than a recording distance determined in accordance with the recording resolution information.

According to this aspect, it is possible to respond appropriately even if the minimum dot size is larger than the resolution.

In order to attain the aforementioned object, the present invention is also directed to an image processing apparatus for an image recording apparatus that records an image on a recording medium by means of dots, the image processing apparatus comprising: a device which obtains dot size information relating to the dots which have at least one dot size and are recordable by the image recording apparatus, and recording resolution information; and a device which determines dot sizes and recording positions of the dots in accordance with the dot size information and the recording resolution information, in such a manner that a recording width of a text character or line approaches a recording width determined in accordance with the image information, and transforms image information for the text character or line into bitmap data which the image recording apparatus can record the image in accordance with.

Preferably, the at least one dot size are larger than a recording distance determined in accordance with the recording resolution information.

In order to attain the aforementioned object, the present invention is also directed to an image recording apparatus, comprising the above-described image processing apparatus.

According to this aspect of the invention, it is also possible to implement the image processing described above, and therefore, high-quality image recording can be achieved.

As described above, according to the image processing method, the image processing apparatus, and the image recording apparatus in accordance with the present invention, when the recording region on which dots are to be formed corresponds to a text character or line, thickening (or narrowing) of the line and disruption of the shape is prevented. Therefore, it is possible to improve the recording (reproduction) quality of very small text characters and fine lines, at high resolution.

BRIEF DESCRIPTION OF THE DRAWINGS

The nature of this invention, as well as other objects and benefits thereof, is explained in the following with reference to the accompanying drawings, wherein:

FIGS. 6A to 6E are illustrative diagrams showing the selection of a droplet deposition arrangement in an image processing method according to a first embodiment of the present invention, wherein FIG. 6A shows a case where droplets are deposited to form outline area dots, FIG. 6B shows a case where the outline area dots are replaced with dots at immediately adjacent positions to the inner side thereof, FIG. 6C shows the size of the dot formed by the deposited droplets, and FIGS. 6D and 6E show examples of envelope lines of the outline area;

FIGS. 7A and 7B are illustrative diagrams showing further examples of the selection of a droplet deposition arrangement according to the first embodiment, wherein FIG. 7A shows a case where droplets are deposited to form outline area dots, and FIG. 7B shows a case where the outline area dots are replaced with dots at immediately adjacent positions to the inner side thereof;

FIG. 9 is, in the flowchart of FIG. 8, a flowchart showing processing for determining droplet deposition positions in text character or line outline areas, and determining the inner adjacent candidate positions for droplet deposition for same, and the like;

FIGS. 10A to 10J are illustrative diagrams showing patterns in determining the outline, outline direction, and the like;

FIGS. 11A to 11J are also illustrative diagrams showing patterns in determining the outline, outline direction, and the like;

FIGS. 15A to 15C are illustrative diagrams showing the selection of a droplet deposition arrangement in the image processing according to a third embodiment of the present invention, wherein FIG. 15A shows a case where droplets are deposited to form outline area dots, FIG. 15B shows a case where droplets are deposited to form dots at positions immediately adjacent to the outline area dots on the inner side thereof, and FIG. 15C shows a case where droplets are deposited to form dots at positions situated two positions to inner side from the outline area dots;

FIGS. 21A and 21B are illustrative diagrams showing droplet deposition arrangements according to the related art, wherein FIG. 21A shows an originally intended recording region, and FIG. 21B shows thickening of a line; and FIGS. 22A and 22B are illustrative diagrams showing droplet deposition arrangements according to the related art, wherein FIG. 22A shows originally intended recording regions, and FIG. 22B shows thickening of a line.

DETAILED DESCRIPTION OF THE PREFERRED EMBODIMENTS

Figure 1:
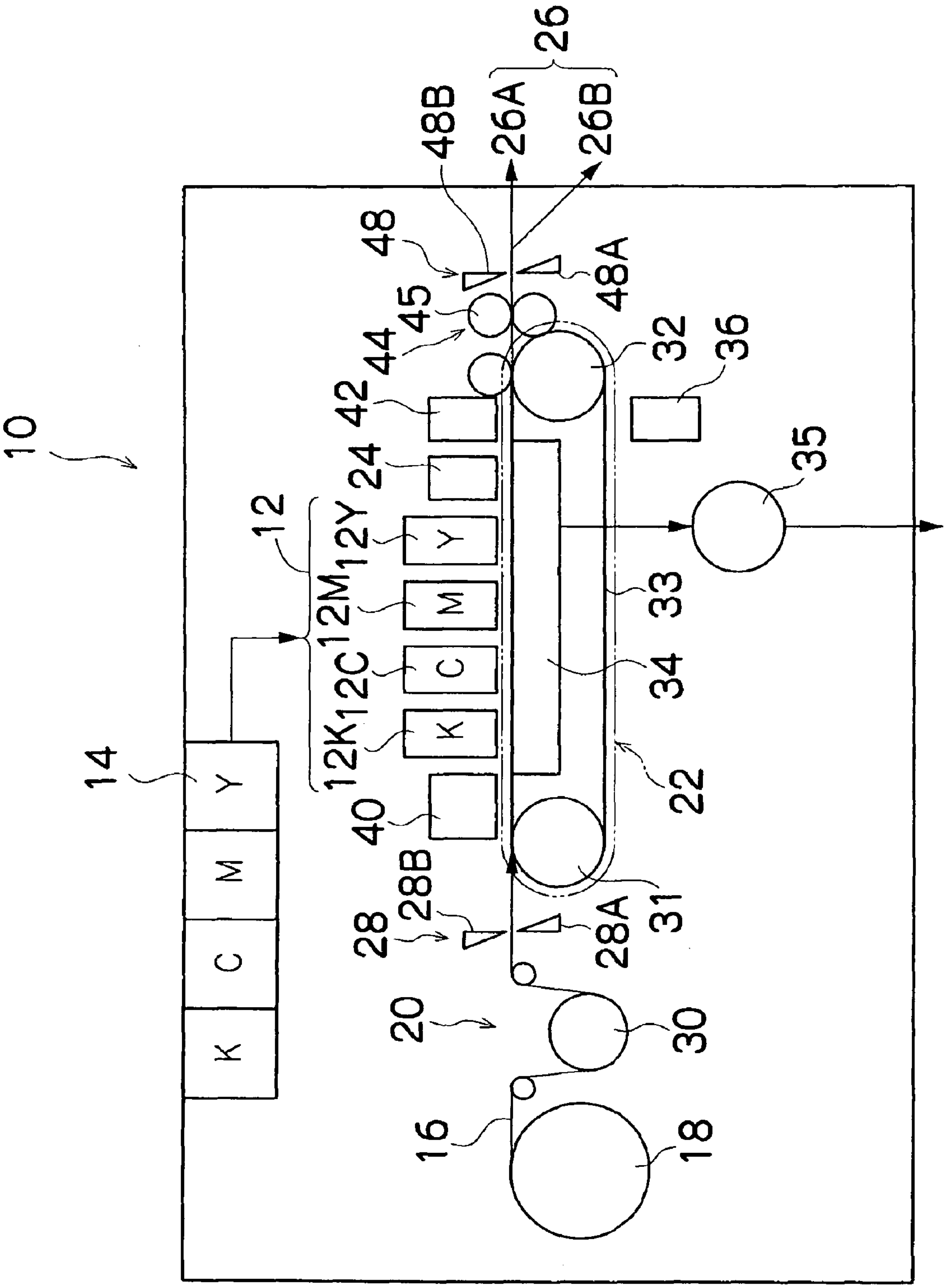
FIG. 1 is a general schematic drawing of an inkjet recording apparatus according to an embodiment of the present invention.

FIG. 1 is a general schematic drawing of an inkjet recording apparatus that forms one embodiment an image recording apparatus according to the present invention.

As shown in FIG. 1, the inkjet recording apparatus 10 includes: a printing unit 12 having a plurality of print heads 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16 supplied from the paper supply unit 18; a suction belt conveyance unit 22 disposed facing the nozzle face (ink droplet ejection face) of the print unit 12, for conveying the recording paper 16 while keeping the recording paper 16 flat; a print determination unit 24 for reading the result of the printing produced by the printing unit 12; and a paper output unit 26 for outputting image-printed recording paper (printed matter) to the exterior.

In FIG. 1, a magazine for rolled paper (continuous paper) is shown as an example of the paper supply unit 18; however, more magazines with papers different in paper width, paper quality, or the like, may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 1, and the roll paper is cut to a desired size by the cutter 28. The cutter 28 has a stationary blade 28A of which length is not less than the width of the conveyor pathway of the recording paper 16, and a round blade 28B which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium, such as a bar code and a wireless tag containing information about the type of paper, is attached to the magazine. In these cases, by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl which arise because the recording paper 16 having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24, forms a plane (flat plane).

The belt 33 has a width that is greater than the width of the recording paper 16, and a plurality of suction apertures (not shown) are formed on the belt surface. As shown in FIG. 1A, a suction chamber 34 is disposed in a position facing the sensor surface of the print determination unit 24 and the nozzle surface of the printing unit 12 on the interior side of the belt 33, which is set around the rollers 31 and 32. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, and a combination of these. In the case of the configuration in which the belt 33 is nipped with the cleaning rollers, it is preferable to make the line velocity of the cleaning rollers different than that of the belt 33 in order to improve the cleaning effect.

The inkjet recording apparatus 10 can include a roller nip conveyance mechanism, in which the recording paper 16 is pinched and conveyed with nip rollers, instead of the suction belt conveyance unit 22. However, there is a possibility that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed before the printing unit 12 in the conveyance pathway formed by the suction belt conveyance unit 22. The heating fan 40 blows heated air onto the recording paper 16 to heat the recording paper 16 immediately before printing, so that the ink deposited on the recording paper 16 dries more easily.

The print unit 12 is a so-called full-line head (see FIG. 2) having a length corresponding to the maximum paper width. The print unit 12 includes print heads 12K, 12C, 12M and 12Y corresponding to the four colors (black (K), cyan (C), magenta (M) and yellow (Y)), each of the print heads 12K, 12C, 12M, and 12Y having a plurality of ejection openings (nozzles) and being arranged in such a manner that the lengthwise direction of the print heads 12K, 12C, 12M, and 12Y is aligned with the width direction of the recording paper 16 (the main scanning direction) which is perpendicular to the paper conveyance direction (the sub-scanning direction).

Figure 2:
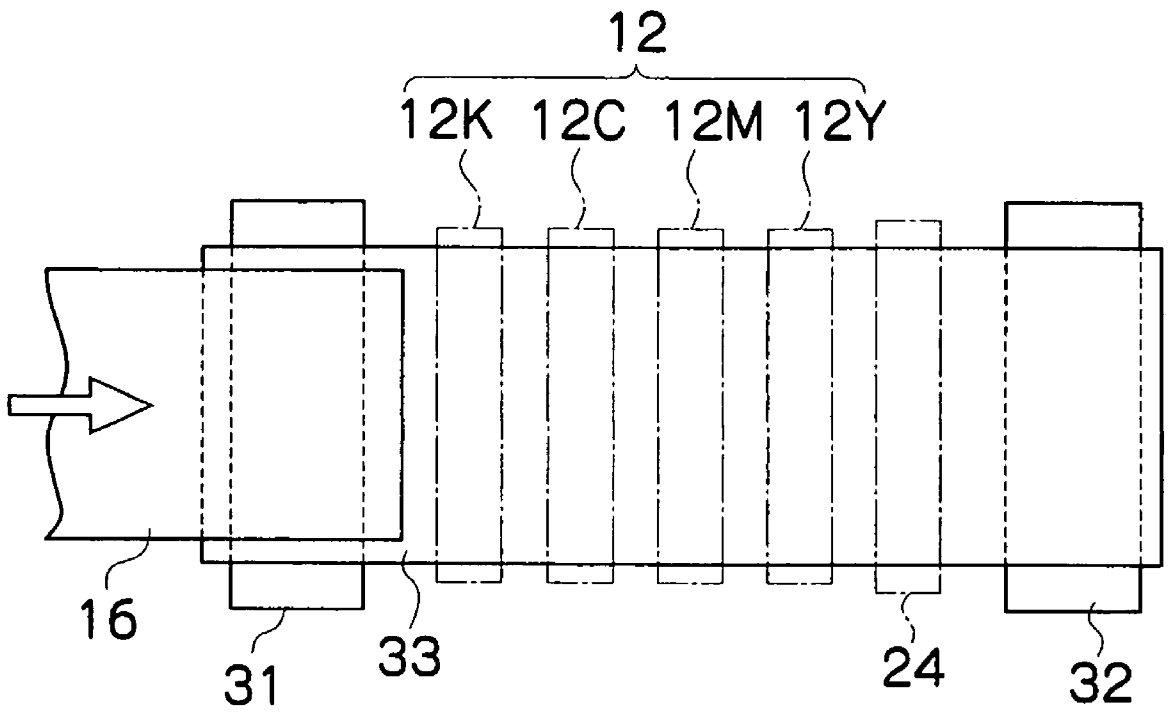
FIG. 2 is a principal plan view of the peripheral area of a print unit in the inkjet recording apparatus shown in FIG. 1.

As shown in FIG. 2, the print heads 12K, 12C, 12M and 12Y are line heads in which a plurality of ink ejection openings (nozzles) are arranged in the lengthwise direction of the head, the ink ejection openings being present through a length exceeding at least one side of the maximum size recording paper 16 intended for use with the inkjet recording apparatus 10.

The print heads 12K, 12C, 12M, 12Y corresponding to ink colors are disposed in the order, black (K), cyan (C), magenta (M) and yellow (Y), from the upstream side (left-hand side in the diagram), following the direction of conveyance of the recording paper 16 (the paper conveyance direction). A color print can be formed on the recording paper 16 by ejecting the inks from the print heads 12K, 12C, 12M, and 12Y, respectively, onto the recording paper 16 while the recording paper 16 is conveyed.

The print unit 12, in which the full-line heads covering the entire width of the paper are provided for the ink colors, can record an image over the entire surface of the recording paper 16 by performing the action of moving the recording paper 16 and the print unit 12 relatively to each other in the paper conveyance direction just once (in other words, by means of a single scan). Higher-speed printing is thereby made possible and productivity can be improved, in comparison with a shuttle type head configuration in which a print head moves back and forth in the direction perpendicular to paper conveyance direction.

Although the configuration with the KCMY four standard colors is described in the present embodiment, combinations of the ink colors and the number of colors are not limited to those in the present embodiment. Light inks or dark inks can be added as required. For example, a configuration is possible in which print heads for ejecting light-colored inks such as light cyan and light magenta are added.

As shown in FIG. 1, the ink storing and loading unit 14 has ink tanks for storing the inks of the colors corresponding to the print heads 12K, 12C, 12M, and 12Y, and the tanks are connected to the print heads 12K, 12C, 12M, and 12Y by means of channels (not shown), respectively. The ink storing and loading unit 14 has a warning device (for example, a display device, an alarm sound generator, or the like) for warning when the remaining amount of any ink is low, and has a mechanism for preventing loading errors among the colors.

The print determination unit 24 has an image sensor (line sensor) for capturing an image of the ink-droplet deposition result of the printing unit 12, and functions as a device to check for ejection defects such as a blockage of the nozzles in the printing unit 12 on the basis of the ink-droplet deposition results evaluated by the image sensor.

The print determination unit 24 in the present embodiment includes at least a line sensor having rows of light receiving elements with a width that is greater than the ink-droplet deposition width (image recording width) of the print heads 12K, 12C, 12M, and 12Y. This line sensor has a color separation line CCD sensor including a red (R) sensor row composed of light receiving elements (pixels) arranged in a line provided with an R filter, a green (G) sensor row with a G filter, and a blue (B) sensor row with a B filter. Instead of a line sensor, it is possible to use an area sensor composed of light receiving elements that are arranged two-dimensionally.

The print determination unit 24 reads a test pattern image printed by the print heads 12K, 12C, 12M, and 12Y for the colors, and determines the ejection from each head 12K, 12C, 12M and 12Y. The ejection determination includes determining whether the ejection is performed or not, measuring the dot size, and determining the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure, prevents the ink from coming contact with ozone and other substance that cause dye molecules to break down. Thus, the durability of the print is improved.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, so that the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed immediately before the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown, the paper output unit 26A for the target prints is provided with a sorter for collecting prints according to print orders.

The present embodiment is described with respect to an example where the print heads 12K, 12C, 12M and 12Y are full line type heads in which a plurality of ink ejection openings (nozzles) are arranged through a length exceeding at least one edge of the maximum size of recording paper 16 that is intended for use with the inkjet recording apparatus 10, as shown in FIG. 2. Incidentally, it is also possible to achieve a length corresponding to the full width of the recording medium by joining together short heads that are arranged two-dimensionally in a staggered matrix configuration, though this composition is not shown in the drawings.

Next, the structure of the print head is described below. The print heads 12K, 12C, 12M, and 12Y provided for the ink colors have the same structure. Therefore, these print heads are represented by one print head 50 in the following description.

Figure 3:
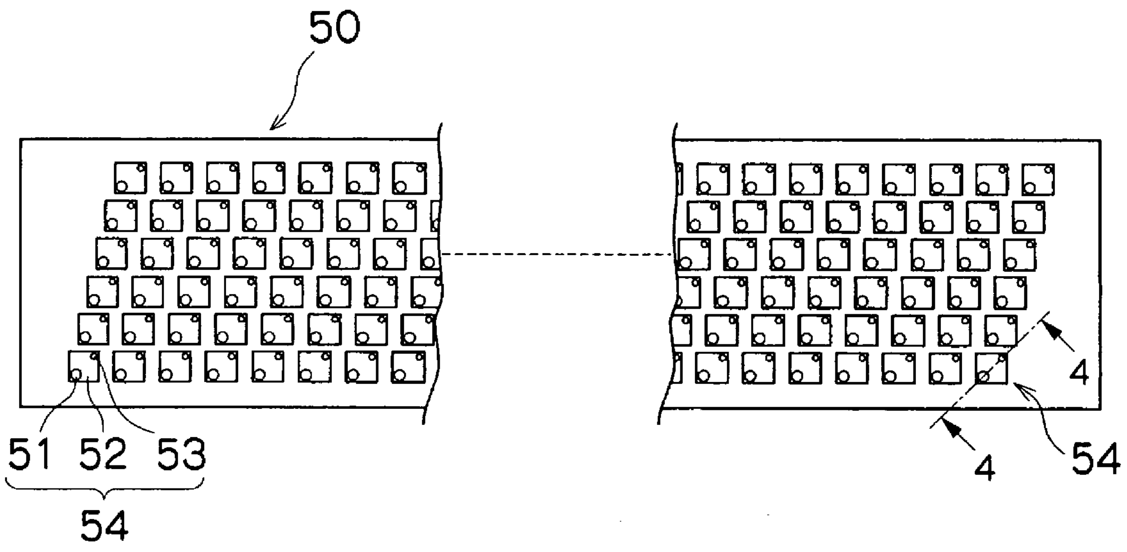
FIG. 3 is a plan view perspective diagram showing a further example of the structure of a print head.

FIG. 3 is a plan view perspective diagram showing an example of the structure of the print head 50. As shown in FIG. 3, the print head 50 in the present embodiment achieves a high density arrangement of the apparent nozzle distance between the nozzles 51 by using a two-dimensional staggered matrix array of a plurality of pressure chamber units 54. Each of the pressure chamber units 54 includes a nozzle 51 for ejecting ink as ink droplets, a pressure chamber 52 for applying pressure to the ink in order to eject ink, and an ink supply opening 53 for supplying ink to the pressure chamber 52 from a common flow channel (not shown).

As shown in FIG. 3, each pressure chamber 52 has an approximately square planar shape when viewed from above. A nozzle 51 is formed at one end of a diagonal of the chamber, while an ink supply opening 53 is provided at the other end thereof. The pressure chambers 52 are connected to a common ink flow channel (not shown) via ink supply openings 53. The ink is supplied to the pressure chambers 52 from the common flow channel via the ink supply openings 53. The pressure chambers 52 are caused to deform by the pressure applied by actuators (not shown), or the like, in such a manner that ink is ejected from the nozzles 51 to the recording paper.

Figure 4:
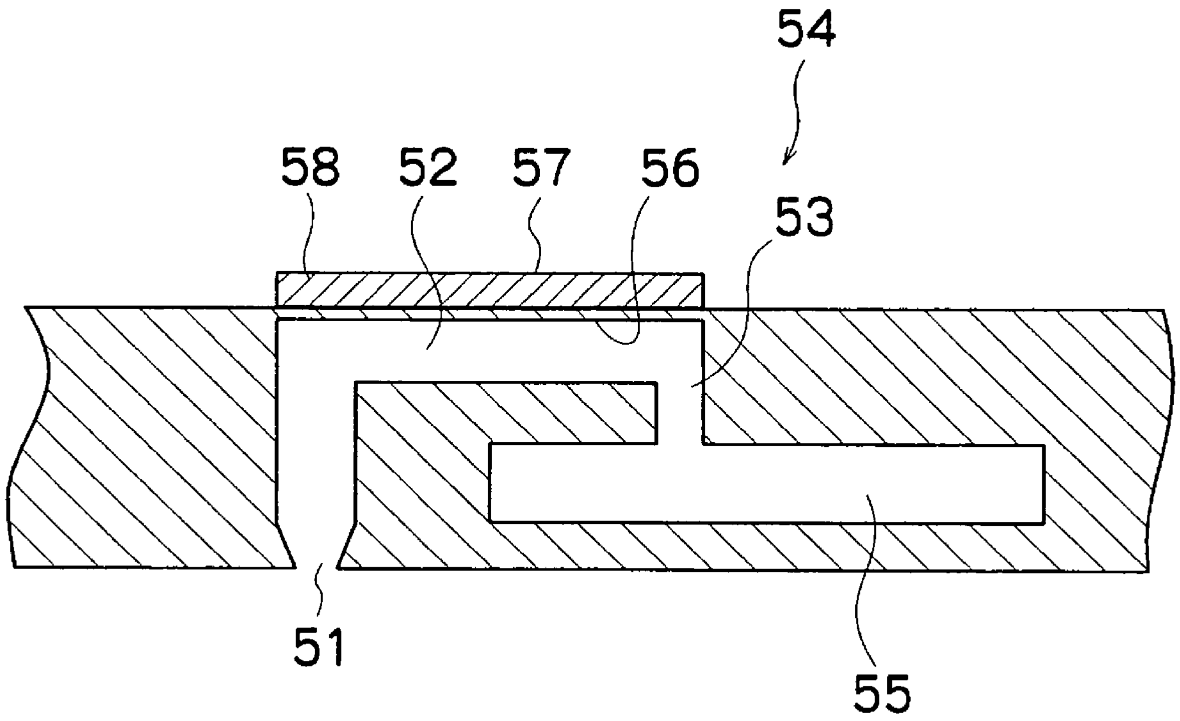
FIG. 4 is a cross-sectional diagram along line 4-4 in FIG. 3.

FIG. 4 shows a cross-sectional view of the pressure chamber 54 along the alternate long and short dash line 4-4 in FIG. 3.

As shown in FIG. 4, each of the pressure chamber units 54 includes a diaphragm 56 forming the upper surface of the pressure chamber 52, and a piezoelectric element 58 is formed on top of the diaphragm 56. Moreover, an individual electrode 57 is formed on the piezoelectric element 58. Furthermore, the diaphragm 56 also functions as a common electrode. By applying a drive voltage to the common electrode (diaphragm 56) and an individual electrode 57, the piezoelectric element 58 deforms, the diaphragm 56 distorts, and the volume of the pressure chamber 52 is reduced, so that ink is ejected from the nozzle 51. After ejecting ink, new ink is supplied to the pressure chamber 52 from the common flow channel 55 through the ink supply opening 53.

Figure 5:
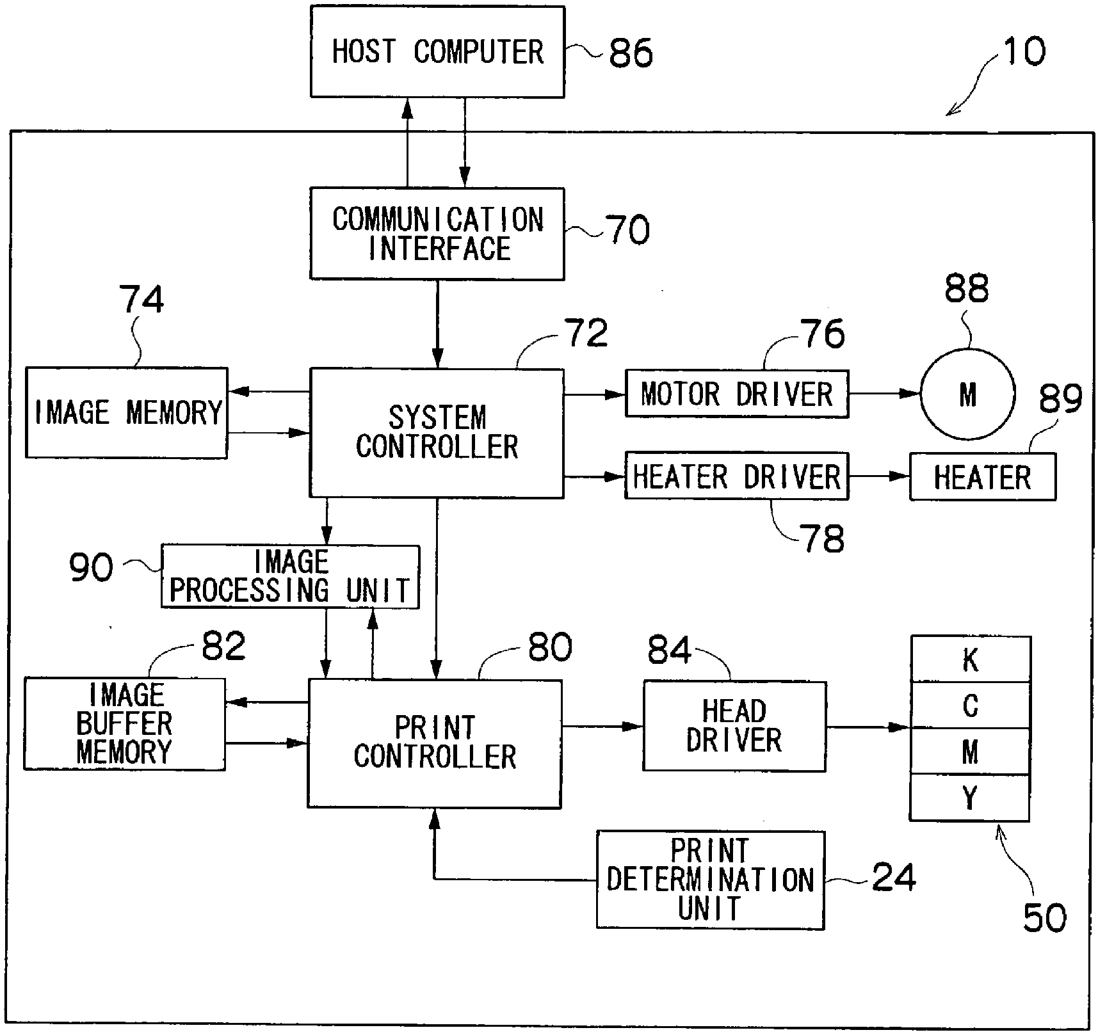
FIG. 5 is a diagram of the system composition of the inkjet recording apparatus shown in FIG. 1.

FIG. 5 is a principal block diagram showing the system configuration of the inkjet recording apparatus 10 in the present embodiment. The inkjet recording apparatus 10 includes a communication interface 70, a system controller 72, an image memory 74, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface, may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communications interface 70, the image memory 74, the motor driver 76, the heater driver 78, and the like. The system controller 72 includes a central processing unit (CPU), peripheral circuits thereof, and the like. In addition to controlling communications with the host computer 86, controlling reading and writing from and to the image memory 74, and the like, the system controller 72 also generates a control signal for controlling the motor 88 of the conveyance system and the heater 89.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals according to the image data stored in the image memory 74 in accordance with commands from the system controller 72. The print controller 80 supplies the generated print control signal (print data) to the head driver 84. Required signal processing is carried out in the print controller 80, and the ejection amount and the ejection timing of the ink droplets from the print heads 50 are controlled via the head driver 84, according to the print data. By this means, the desired dot sizes and dot positions can be achieved.

The print controller 80 is provided with the image buffer memory 82; and image data, parameters, and other data are temporarily stored in the image buffer memory 82 when image data is processed in the print controller 80. Although the example shown in FIG. 5 is one in which the image buffer memory 82 accompanies the print controller 80, the image memory 74 may also serve as the image buffer memory 82. It is possible that the print controller 80 and the system controller 72 are integrated to form a single processor.

The head driver 84 drives the piezoelectric elements 58 of the print heads 12K, 12C, 12M and 12Y with the colors according to print data supplied by the print controller 80. The head driver 84 can be provided with a feedback control system for maintaining constant drive conditions for the print heads.

Furthermore, in the present embodiment, the inkjet recording apparatus 10 includes, in addition to the foregoing elements, an image processing unit 90 which forms an image processing apparatus for controlling the overlap between a plurality of inks (the overlap between dots) with the aim of balancing between image resolution and tonal gradation.

In FIG. 5, for the sake of convenience, the image processing unit 90 is formed as a separate device from the system control 72 and the print controller 80; however, the image processing unit 90 may be incorporated in the system controller 72 or the print controller 80, the image processing unit 90 forming a portion thereof, for example.

The image processing unit 90 receives dot size information and recording resolution information from the print controller 80. If the droplet deposition region corresponds to a text character or line, then image processing is performed by selecting the dot size and the droplet deposition positions, so that the quality of very small text characters or fine lines recorded at a high density is improved. The details of the image processing carried out by the image processing unit 90 are described below.

Firstly, a first embodiment of an image processing method according to the present invention is described below.

FIGS. 6A to 6E show examples of the droplet deposition arrangement according to the image processing method of the first embodiment. The present embodiment is based on the premise that the minimum dot size is larger than the recording distance between the dots.

Figure 6A:
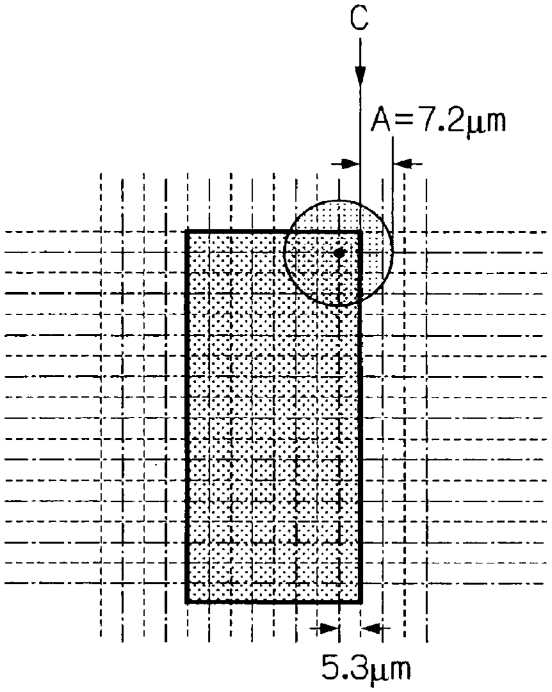
Figure 6B:
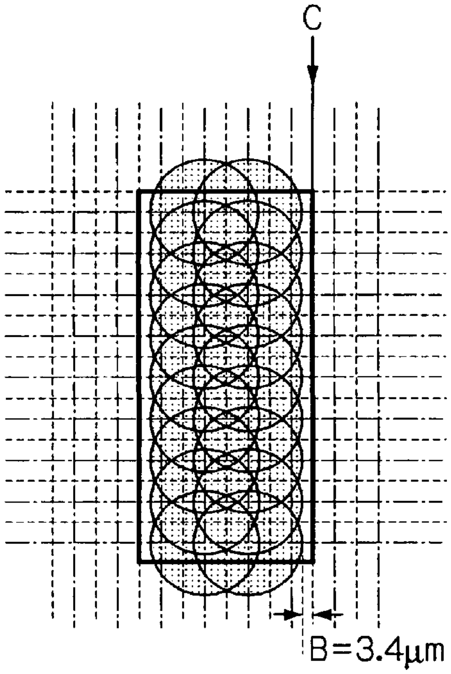
Figure 6C:
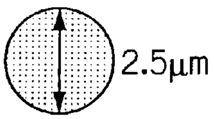

In FIGS. 6A and 6B, the points of intersection of the alternate long and short dash lines extending vertically and horizontally, indicate the centers of the recorded (formed) dots. In the present embodiment, each of the dots formed by the droplet deposition is set to have a dot diameter of 25 μm, as shown in FIG. 6C. Furthermore, in order to avoid complication in the illustrations, in FIG. 6A, only one dot is depicted in the uppermost right-hand end, and in FIG. 6B, only two rows of dots are depicted from the right-hand side.

The resolution is set to be a high density of 2400 dpi. Consequently, the distance between the centers of adjacent dots, that is, the recording distance, which is represented by the distance between the alternate long and short dash lines in FIGS. 6A and 6B, is 10.6 μm (=25.4 mm (1 inch)/2400). In this case, in FIGS. 6A and 6B, an ideal case is one in which recording is performed by means of dots formed on the intersection points of the alternate long and short dash lines, within the interior of each of the square shapes which is indicated by the dotted lines and has an edge of the same length as the distance between the dot centers, the centers of the square shapes corresponding to the intersection points of the alternate long and short dash lines. The region demarcated by the rectangular shape of the solid lines in FIGS. 6A and 6B is the ideal region where the ideal recording is expected.

In this case, as shown in FIG. 6A, the distance from the alternate long and short dash line which corresponds to the right-hand-most droplet deposition position in the ideal region, to the ideal outline position C at the right-hand end in the ideal region, is ½ of the distance between dot centers, 10.6 μm, in other words, it is 5.3 μm.

In contrast, the dot diameters of the droplets that are actually deposited are 25 μm. Consequently, as shown in FIG. 6A, the radius of the dot formed by a droplet deposited onto the right-hand-most droplet deposition position of the ideal region (an intersection point of the alternate long and short dash lines), is 12.5 μm (=25 μm/2), and the dot therefore runs over by A=7.2 μm (=12.5 μm−5.3 μm) to the right-hand side from the ideal outline position C. Hence, if droplets are deposited to form dots onto all of the droplet deposition positions (intersection points of the alternate long and short dash lines) in the ideal region, then a dot similarly runs over to the left-hand side in the ideal region, and hence the line becomes thicker than the width of the line corresponding to the ideal region in which recording is originally intended.

In view of such circumstances, in the present embodiment, as shown in FIG. 6B, droplets are not deposited to form dots (the outline area dots) onto the droplet deposition positions on the outermost alternate long and short dash lines on the left and right-hand sides of the ideal region. In this case, considering the right-hand side, for example, the distance from the center of a dot deposited such that the dot center coincides with a droplet deposition position on an alternate long and short dash line located inward by one position from the right-hand-most alternate long and short dash line of the ideal region, to the ideal outline position C which is the end of the ideal region, is 15.9 μm (=10.6 μm+5.3 μm). Accordingly, the distance B from the outermost perimeter of the dot to the ideal outline position C is 3.4 μm, which is obtained by subtracting the dot radius 12.5 μm from the aforementioned distance 15.9 μm (i.e., B=15.9 μm−12.5 μm=3.4 μm).

In the above-described case, when the calculated value A (=7.2 μm) is compared with the calculated value B (=3.4 μm), the value B is the smaller than the value A. Hence, concerning the value B, it can be seen that the divergence from the ideal outline position C is smaller, and it is nearer to the ideal outline position C. Therefore, in this case, as shown in FIG. 6B, the droplet deposition arrangement is determined in such a manner that the dots corresponding to the outline areas are not deposited. In this way, by determining the droplet deposition arrangement shown in FIG. 6B, thickening of the text characters or lines can be prevented.

The criteria for determining the droplet deposition arrangement in this way is based on the selection of an arrangement which minimizes the amount of divergence between the outermost perimeters of the actually recorded dots and the ideal outline position C. The amount of divergence with respect to the ideal outline position C may relate to a case where the formed dots project to the outer side with respect to the ideal outline position C as shown in FIG. 6A, and a case where the deposited dots are located in the inner side with respect to the ideal outline position C as shown in FIG. 6B. In order to treat these cases in a uniform fashion, the absolute value of the amount of divergence is calculated and is set as a distance between two points, in such a manner that the amount of divergence is constantly compared on the basis of positive value.

The distance between the outermost perimeters of the dots and the ideal outline position C is described on the basis of a line which passes through the center of the dot and is perpendicular to the ideal outline; however, the distance may not necessarily described on the basis of this line. For example, it is also possible to use the distance on the basis of a perpendicular line dropped to the ideal outline from another position on the outer perimeter of the outline of a dot.

Figure 6D:
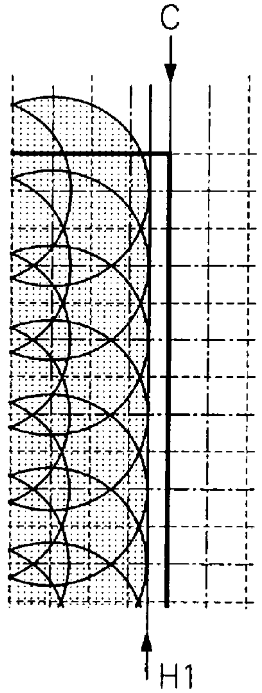
Figure 6E:
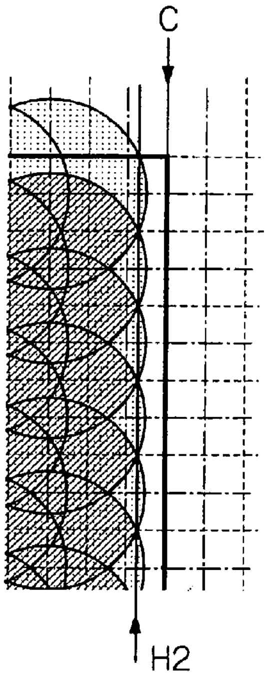

Specifically, as shown in FIG. 6D, the distance between the line (envelope) H1 which makes contact with the outermost perimeters of the dots and the ideal outline position C, is used in the above description; however, as shown in FIG. 6E, it is also possible to use the distance between the line (also called envelope) H2 which makes contact with the outermost perimeters (these outermost perimeters corresponding to the sharp portions on the right-end of the shaded sections in FIG. 6E) of the sections (the shaded sections in the diagram) where the dots are mutually overlapping, and the ideal outline position C.

Figure 7A:
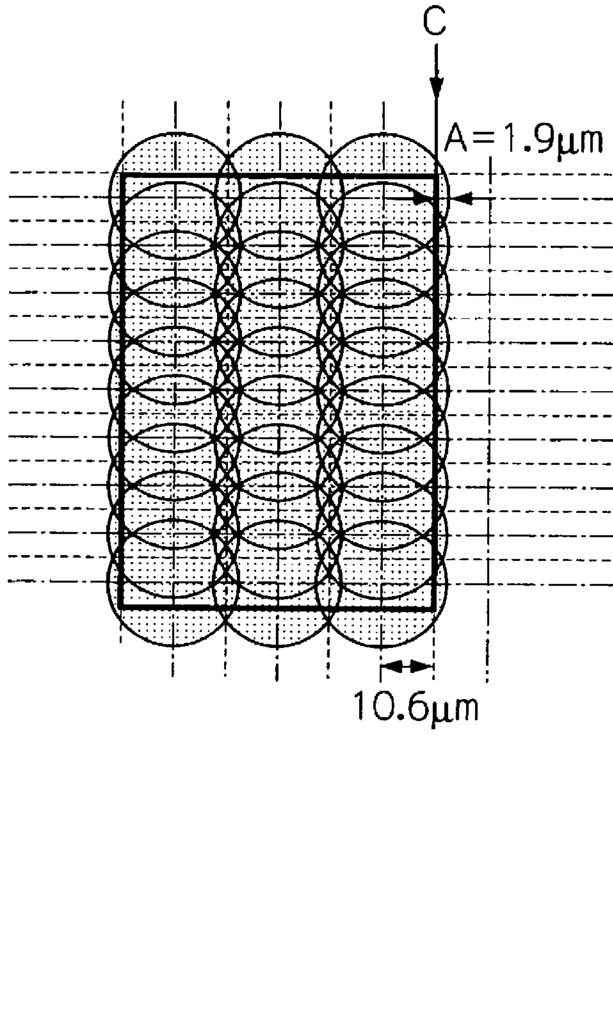
Figure 7B:
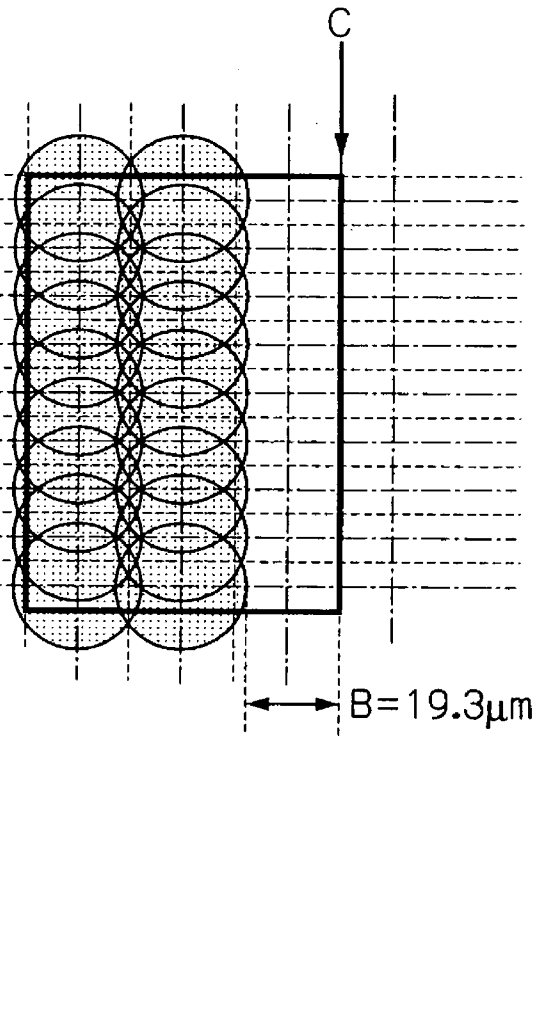

Next, FIGS. 7A and 7B show another of the determination of a droplet deposition arrangement for preventing line thickening. In the examples shown in FIGS. 7A and 7B, the resolution is 1200 dpi in the main scanning direction (the lateral direction in FIGS. 7A and 7B), and 2400 dpi in the sub-scanning direction (the vertical direction in FIGS. 7A and 7B). The dot size (dot diameter) used in droplet deposition is 25 μm, which is the same as the previous example. Furthermore, the ideal region, in which recording is originally expected, is the rectangular shape indicated by the solid lines, and the points of intersection between the alternate long and short dash lines extending vertically and horizontally indicate the droplet deposition positions. In these examples, only the right-hand outline of the ideal region is discussed.

FIG. 7A shows a case where droplets are deposited to form dots normally on the droplet deposition positions indicated by the intersection points of the alternate long and short dash lines. In this case, for example, in the right-hand side, the distance from the center of the right-hand-most dot to the ideal outline position C, which is at the right-hand end of the ideal region, is one half of the distance in the lateral direction between the alternate long and short dash lines (one half of the distance between the centers of the dots aligned in the lateral direction). Since the resolution in the lateral direction (main scanning direction) is 1200 dpi, then this distance is 10.6 μm (=25.4 mm (1 inch)/1200/2). Therefore, the amount of divergence between the right-hand-most dot and the ideal outline position C is 1.9 μm (=12.5 μm−10.6 μm), which is obtained by subtracting the distance 10.6 μm thus found from the radius of the dot, 12.5 μm. As shown in FIG. 7A, the right-hand-most dot projects to the outer side beyond the ideal outline position C, by a distance of A (=1.9 μm).

On the other hand, FIG. 7B shows a case in which formation of dots is not performed on the right-hand-most droplet deposition positions in the ideal region. In this case, the distance from the center of a dot deposited onto a droplet deposition position located inward by one position from the right-hand-most position, to the ideal outline position C, is three times the half-value 10.6 μm, which corresponds to one half of the distance in the lateral direction between the alternate long and short dash lines determined above. Hence, the distance B from the outermost perimeter of the dot to the ideal outline position C is 19.3 μm, which is obtained by subtracting the dot radius 12.5 μm from that distance (i.e., B=10.6 μm×3−12.5 μm=19.3 μm).

Considering the amounts of divergences A and B between the ideal outline position C and the position of the right-hand-side outermost perimeter of the dot deposited actually in the cases in FIG. 7A and in FIG. 7B, A=1.9 μm and B=19.3 μm are satisfied as described above. Thus A is smaller than B (A<B), and in this case, the droplet deposition arrangement shown in FIG. 7A is selected.

According to this selection, although the line is thickened only slightly (by approximately 1.9 μm on either side) in the case of FIG. 7A, it is desirable to select the droplet deposition arrangement shown in FIG. 7A because the line becomes too thin (by approximately 19.3 μm on either side) in the case of FIG. 7B.

Some examples are described above, in which the droplet deposition arrangements are determined so that the disturbance of a line shape due to thickening of the line (or excessive thinning of the line, or the like) can be prevented. The method of how to determine these droplet deposition positions is described with respect to a flowchart illustrating the processing.

Figure 8:
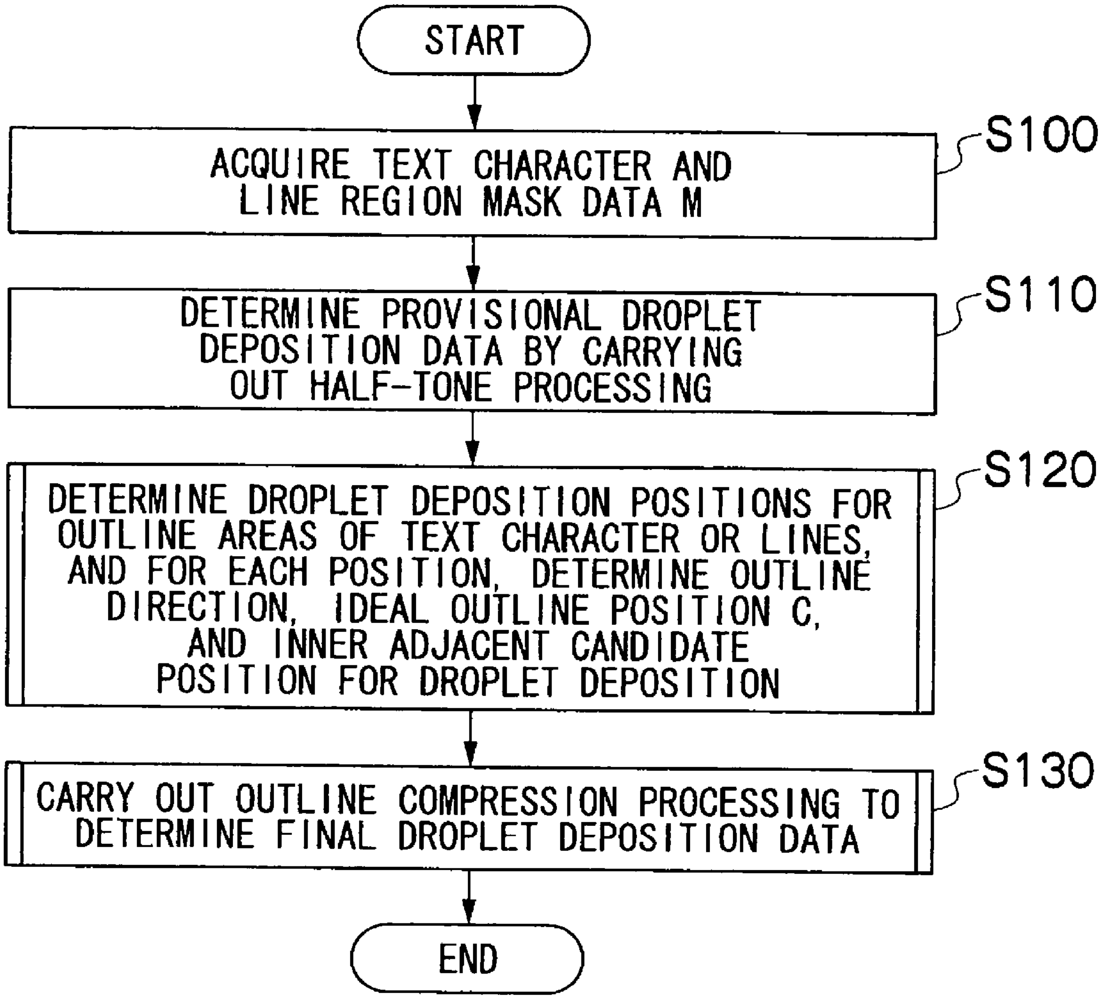
FIG. 8 is a flowchart showing an overall sequence of image processing according to the first embodiment.

FIG. 8 is a flowchart showing an overall sequence of the image processing which includes this determination of a droplet deposition arrangement and other processing.

Firstly, at step S100 in FIG. 8, mask data M for the region for a text character or line is acquired. This mask data M is data that indicates whether the data is a text character region or a line region. Although described in more detail below, the mask data M is used for the processing of the selection of the droplet deposition positions for the outline of the text character or line, and used for the processing of determining the outline direction. The mask data M for the region for a text character or line may be acquired when the vector data for a text character or line is transformed into bitmap data.

Next, at step S110, provisional droplet deposition data is determined by performing half-tone processing. The half-tone processing serves to reproduce the continuous tonal graduation of the image. As the half-tone processing, a commonly known method, such as error diffusion method or a dither matrix method, can be used. The data for the dot arrangement is determined on the basis of the provisional droplet deposition data.

Whether the data relates to text characters or a line, is determined according to the mask data M determined above. Hence, at the next step S120, it is determined whether each set of data corresponds to a text character or a line, and the outline of the text character or line is determined. More specifically, the outline droplet deposition positions of the text character or line section are selected, and for each position, the outline direction, ideal outline position (that shown by the reference symbol C in FIGS. 6A to 6E and the other drawings), and inner adjacent candidate positions for droplet deposition, are determined. The processing in this step S120 is described in detail in a separate flowchart.

Next, at step S130, outline compression processing is carried out, and the final droplet deposition data, that is, the droplet deposition arrangement described above, is determined. The processing in this step, S130 is also described in more detail below with reference to a separate flowchart.

Figure 9:
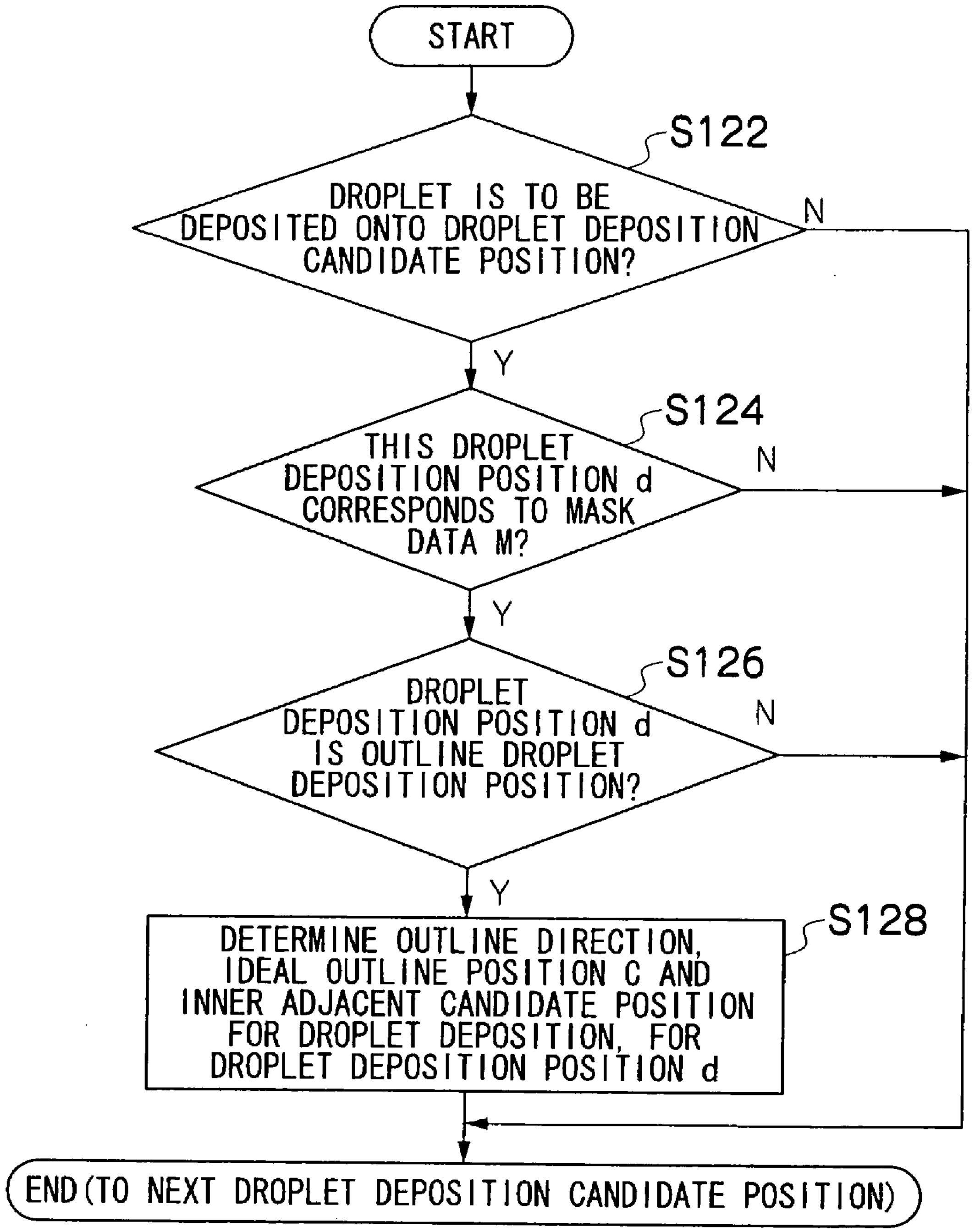

FIG. 9 is a flowchart of processing for determining the outline droplet deposition positions of a text character or line section, and a processing for determining the line direction and inner adjacent candidate positions for droplet deposition. The flowchart shown in FIG. 9 indicates the processing relating to one droplet deposition position.

Firstly, at step S122 in FIG. 9, it is determined whether a droplet is to be deposited onto the droplet deposition candidate position or not. If there is no droplet to be deposited onto the droplet deposition candidate position, then the processing is terminated and the procedure transfers to processing for the next droplet deposition candidate position.

If a droplet is to be deposited at the droplet deposition candidate position, then the procedure advances to the next step S124. At step S124, it is determined whether the droplet deposition position d corresponds to the mask data M or not, that is, whether the data corresponds to a text character or line or not. If the droplet deposition position d does not correspond to the mask data M, that is, if the data corresponds to neither a text character nor a line, then this processing is terminated and the procedure transfers to the processing of the next droplet deposition candidate position.

If the droplet deposition position d corresponds to the mask data M in the determination at step S124, then the data indicates a text character or line, and the procedure advances to the next step S126. At step S126, it is determined whether the droplet deposition position d is an outline or not, that is, whether the position corresponds to an outline droplet deposition position or not.

Consequently, if the position does not correspond to an outline droplet deposition position, then the processing is terminated and the procedure is transferred to the processing for the next droplet deposition candidate position. If the position corresponds to an outline droplet deposition position, then the procedure advances to the next step S128. At the step S128, the outline direction, ideal outline position C, and inner adjacent candidate position for droplet deposition are determined for this droplet deposition position d.

The concrete details of the method of determining whether the droplet deposition position d is an outline droplet deposition position or not, and the method of determining the outline direction, ideal outline position C, and inner adjacent candidate position for droplet deposition relating to the droplet deposition position d, are described below with reference to the drawings.

It is determined whether the eight droplet deposition positions surrounding the droplet deposition position d, which is the position evaluated to determine whether it is an outline droplet deposition position or not, correspond to the mask data M or not. In other words, it is determined whether the droplet deposition position d is an outline droplet deposition position or not, according to whether the surrounding positions are within the mask or out of the mask. If the droplet deposition position d is an outline position, then the outline direction, ideal outline position C, and inner adjacent candidate position for droplet deposition N are determined.

FIGS. 10A to 10J and FIGS. 11A to 11J show various patterns classified according to whether the eight droplet deposition positions surrounding the droplet deposition position d are within the mask or out of the mask. In FIGS. 10A to 10J and FIGS. 11A to 11J patterns that would be the same as those illustrated if rotated through 90° or 180° or inverted, are omitted from the drawings.

In the patterns shown in FIG. 10A to FIG. 11J, concerning the eight droplet deposition positions surrounding the droplet deposition position d within the mask, a black dot corresponds to the dot within the mask and a white dot corresponds to the dot out of the mask. Furthermore, if the droplet deposition position d corresponds to an outline droplet deposition position, then the outline is indicated by the solid line and the outline direction is indicated by the direction of the arrow extending from the droplet deposition position d. The end point of the arrow indicates the ideal outline position C. A droplet deposition position indicated by a white N inside a black dot on the opposite side of the arrow extending from the droplet deposition position d, represents an inner adjacent candidate position.

Figure 10A:
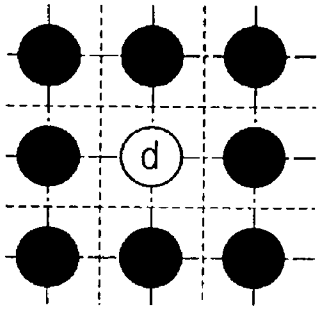
Figure 10B:
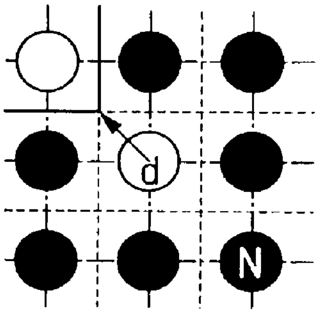

Firstly, in FIG. 10A, all eight of the droplet deposition positions surrounding the droplet deposition position d are within the mask, and the droplet deposition position d is not the outline droplet deposition position. In FIG. 10B, the position to the upper left-hand side with respect to the droplet deposition position d is a white dot, which corresponds to the dot out of the mask, and therefore, the droplet deposition position d corresponds to an outline droplet deposition position. In this case, the outline direction corresponds to the direction of the arrow extending obliquely at an upward and leftward direction of 45° from the droplet deposition position d, and the end point of the arrow indicates the ideal outline position C. Furthermore, the black dot containing a white N on the lower right-hand side opposite the arrow, corresponds to the inner adjacent candidate position for droplet deposition.

Figure 10C:
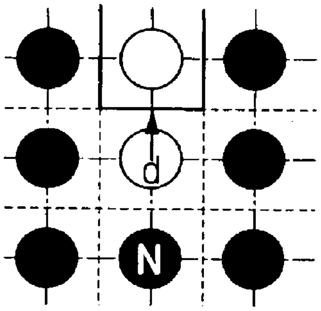
Figure 10D:
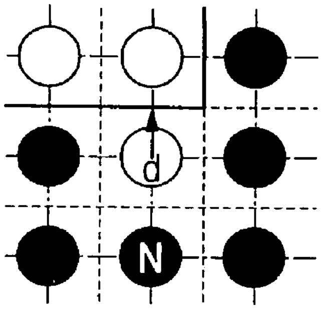
Figure 10E:
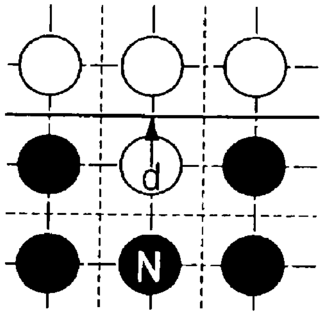

In FIGS. 10C, 10D, and 10E, the positions on the upper side with respect to the droplet deposition position d correspond to white dots, which correspond to the dots out of the mask, and the droplet deposition position d is an outline droplet deposition position. The outline direction is the upward direction as indicated by the arrow. Furthermore, the end point of the arrow indicates the ideal outline position C, and the position on the opposite side with respect to the droplet deposition position d with respect to the direction of the arrow corresponds to the inner adjacent candidate position for droplet deposition.

Figure 10F:
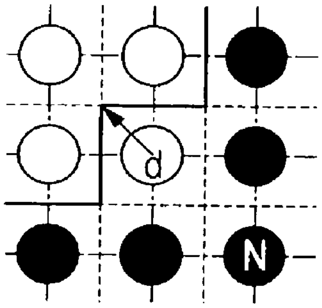
Figure 10G:
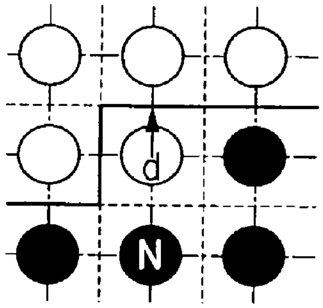
Figure 10H:
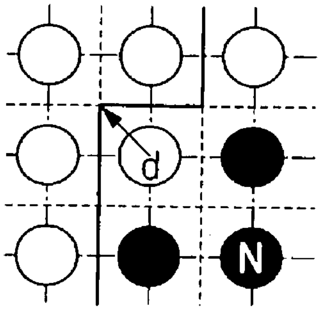

In FIG. 10F, the droplet deposition positions in three directions, the upper side, upper left-hand side, and lateral left-hand side from the droplet deposition position d, correspond to white dots, which correspond to the dots out of the mask. The droplet deposition position d corresponds to an outline droplet deposition position and the outline direction is an oblique upward and leftward direction. In FIG. 10G the position on the lateral left-hand side also is out of the mask; however, all of the three positions on the upper side are out of the mask, and therefore the droplet deposition position d corresponds to an outline droplet deposition position and the outline direction is the upward direction. FIG. 10H is similar to FIG. 10F.

Figure 10I:
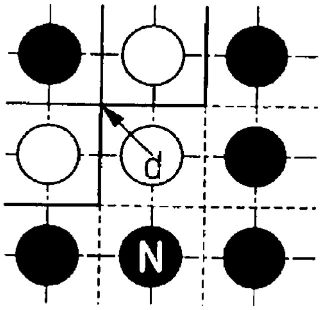
Figure 10J:
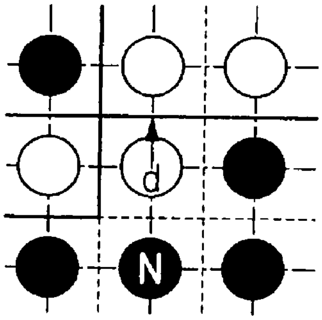

In FIG. 10I, the position on the upper left-hand side with respect to the droplet deposition position d corresponds to a black dot, which corresponds to the dot within the mask; however, the positions on the lateral left-hand side and the upper side are out of the mask. Hence, the droplet deposition position corresponds to an outline droplet deposition position, and the outline direction is an oblique upward and leftward direction. In FIG. 10J, further to FIG. 10I, the position to the upper right-hand side is also out of the mask. Therefore the droplet deposition position d corresponds to an outline droplet deposition position, and the outline direction is the upward direction.

Figure 11A:
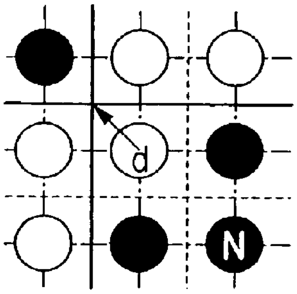
Figure 11B:
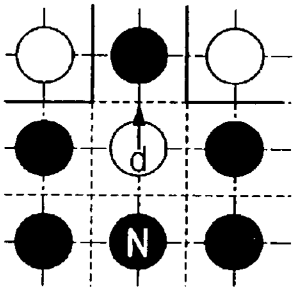
Figure 11C:
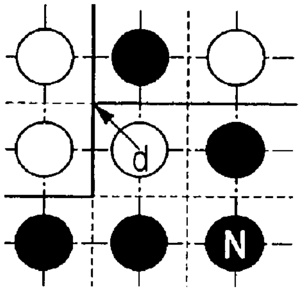
Figure 11D:
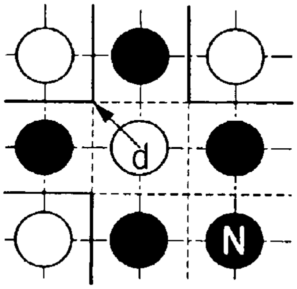
Figure 11E:
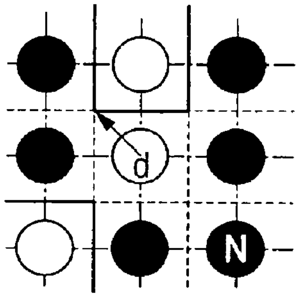
Figure 11F:
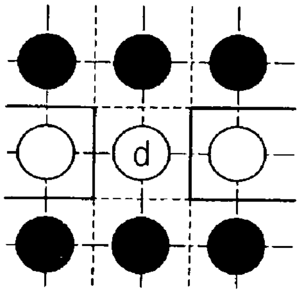
Figure 11G:
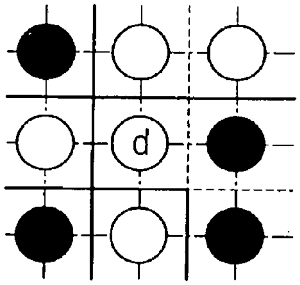
Figure 11H:
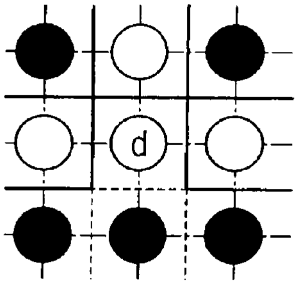
Figure 11I:
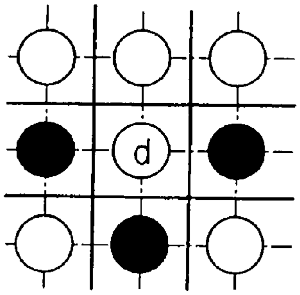
Figure 11J:
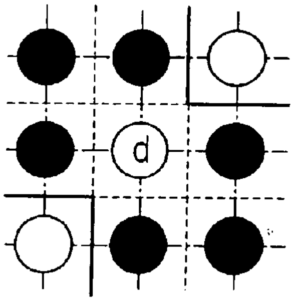

Furthermore, FIG. 11A is similar to FIG. 10I. In FIG. 11B, the position above the droplet deposition position d corresponds to a black dot, which means that it is within the mask; however, the positions on the upper left-hand and upper right-hand sides correspond to white dots, which correspond to the dots out of the mask. Therefore, the droplet deposition position d corresponds to an outline droplet deposition position and the outline direction is the upward direction. Furthermore, in each of FIGS. 11C, 11D, and 11E, the droplet deposition position d corresponds to an outline droplet deposition position and the outline direction is an upward and leftward direction.

In contrast to the above-described patterns, the patterns in FIGS. 11F to 11J have droplet deposition positions d which do not correspond to outline droplet deposition positions.

This is because, in each of these cases, the form of the pattern would be disrupted if droplet deposition is not performed at those positions.

The determination of whether the droplet deposition position d corresponds to an outline droplet deposition position or not at step S126 in FIG. 9, and the determination of the outline direction, ideal outline position C, and inner adjacent candidate position for droplet deposition relating to the droplet deposition position d in step S128, are made by determining whether each of the eight droplet deposition positions surrounding the droplet deposition position d is within the mask or out of the mask, by using the patterns in FIGS. 10A to 10J and FIGS. 11A to 11J.

Figure 12:
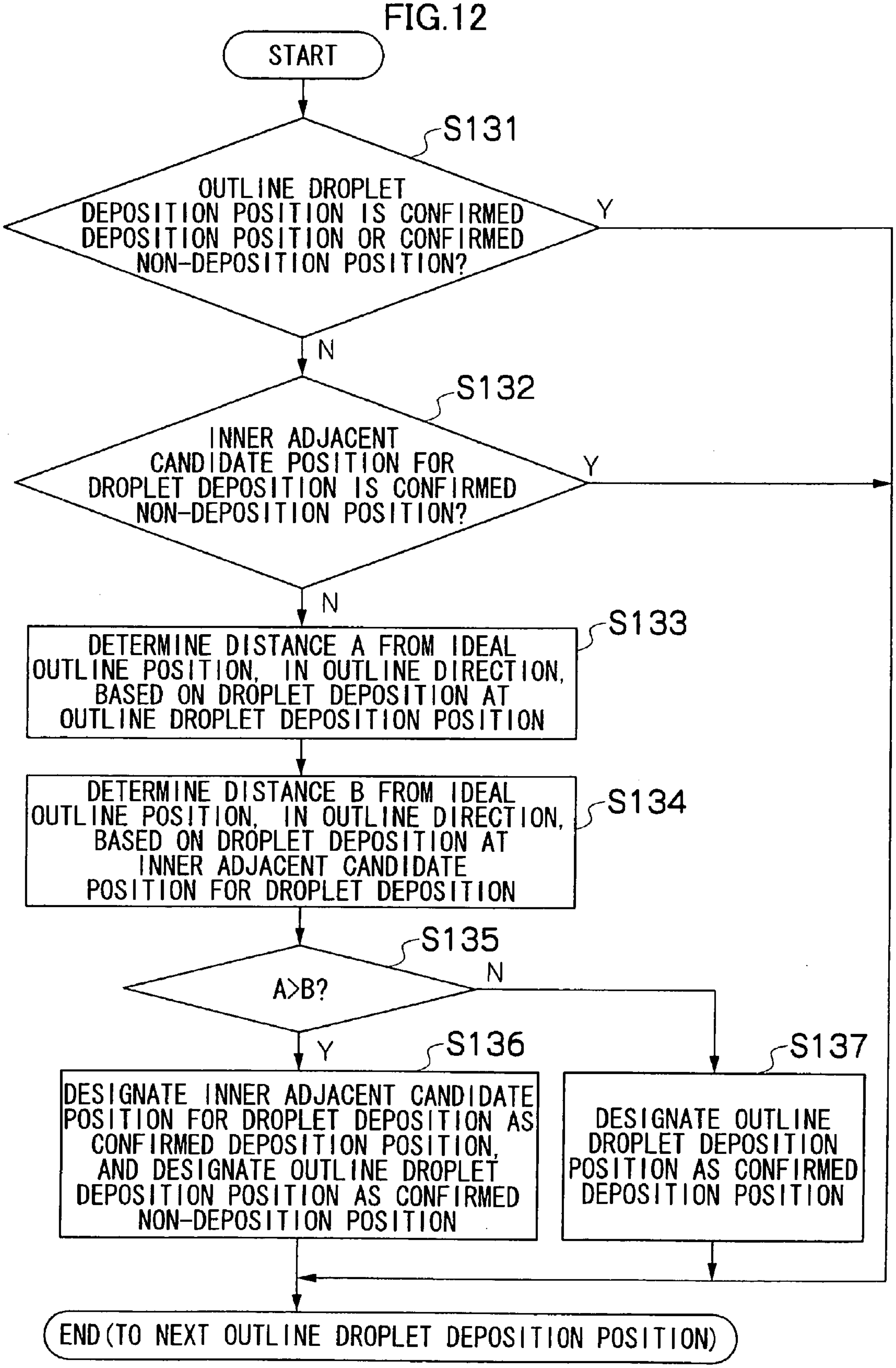
FIG. 12 is a flowchart showing the processing in the flowchart in FIG. 8 for determining the final droplet deposition data by performing outline compression processing.

FIG. 12 shows a flowchart of processing for determining final droplet deposition data by performing outline compression processing in step S130 in FIG. 8.

Firstly, at step S131 in FIG. 12, it is determined whether the outline droplet deposition position corresponds to a confirmed deposition position where it has already been established that a dot is to be deposited or not, and whether it corresponds to a confirmed non-deposition position where it has been established that a dot is not to be deposited. If it is determined as a result of this that the position is one where deposition or non-deposition has been confirmed, then the processing is terminated and the procedure transfers to the processing for the next outline droplet deposition position. This is because further processing is not necessary if it has already been determined in the processing of previous pixel positions whether to deposit a droplet at the pixel position that is currently drawn attention.

If it has not yet been determined whether to deposit a droplet on that outline droplet deposition position or not, then the procedure advances to the next step S132. At the step S132, it is determined whether the inner adjacent candidate position for droplet deposition with respect to that outline droplet deposition position corresponds to a confirmed non-deposition position or not. In other words, it is determined whether it has already been established that a dot is not to be deposited onto the adjacent droplet deposition position to the inner side in the direction opposite to the outline direction with respect to the outline droplet deposition position or not. If, as a result of this determination, the inner adjacent candidate position for droplet deposition corresponds to a confirmed non-deposition position, that is, if it has already been established that no dot is to be deposited onto the inner adjacent candidate position for droplet deposition, then the processing terminates and the procedure transfers to the next outline droplet deposition position.

Furthermore, in the determination at step S132, if the inner adjacent candidate position for droplet deposition does not correspond to a confirmed non-deposition position, that is, if it has not yet been determined that no dot is to be deposited onto the inner adjacent candidate position for droplet deposition, then the procedure advances to the next step. At the next step, it is determined whether to deposit a droplet onto the outline droplet deposition position to form a dot, or to deposit a droplet onto the inner adjacent candidate position for droplet deposition to form a dot, rather than depositing a droplet onto the outline droplet deposition position. This corresponds to the selection of one of the droplet deposition arrangements shown in FIGS. 6A and 6B or FIGS. 7A and 7B.

At step S133, the distance (amount of divergence) A in the outline direction from the ideal outline position C according to the droplet deposition onto the outline droplet deposition position, is determined. At step S134, the distance (amount of divergence) B from the ideal outline position C according to the droplet deposition onto the inner adjacent candidate position for droplet deposition, is determined.

Thereupon, at step S135, the amounts of divergences A and B are compared with each other.

If, as a result of this comparison, the amount of divergence B is smaller, then this means that the amount of divergence from the ideal outline position C in the case of droplet deposition using the inner adjacent candidate position for droplet deposition would be smaller. Therefore, in this case, at step S136, it is determined that no dot is to be deposited onto the outline droplet deposition position and the outline droplet deposition position is designated as a confirmed non-deposition position, whereas it is also determined that the inner adjacent candidate position for droplet deposition is designated as a confirmed deposition position in such a manner that a droplet is deposited onto the inner adjacent candidate position for droplet deposition to form a dot. This corresponds to the selection of the droplet deposition arrangement shown in FIG. 6B.

On the other hand, if, as a result of the comparison in step S135, the amount of divergence A is smaller, then at step S137, the outline droplet deposition position is designated as a confirmed deposition position in such a manner that ink is ejected to deposit a droplet of the ink onto the outline droplet deposition position to form a dot. This corresponds to the selection of the droplet deposition arrangement shown in FIG. 7A.

Next, a second embodiment of the image processing method according to the present invention is described below.

According to this second embodiment, the dot size and the droplet deposition arrangement can be selected, in cases where the dot size is adjustable, that is, in cases where dots of a plurality of sizes can be formed.

Figure 13A:
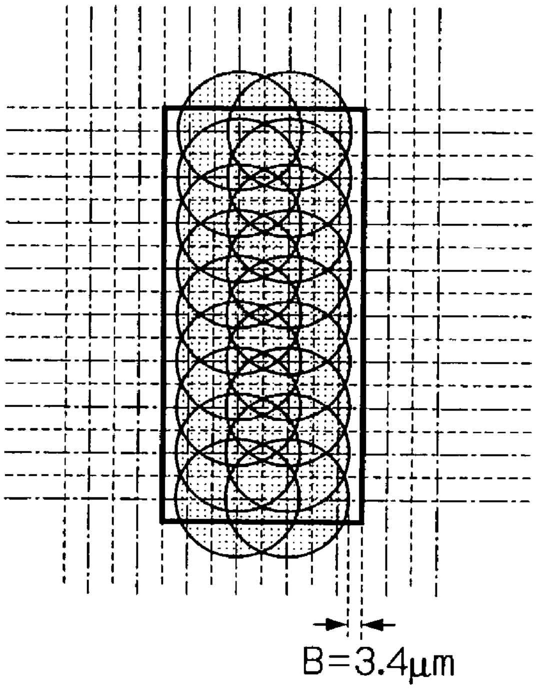
FIGS. 13A and 13B are illustrative diagrams showing the selection of a droplet deposition arrangement in the image processing method according to a second embodiment of the present invention, and they illustrate cases where droplets are deposited to form dots of different sizes, at positions immediately adjacent to the outline area dots on the inner side thereof.
Figure 13B:
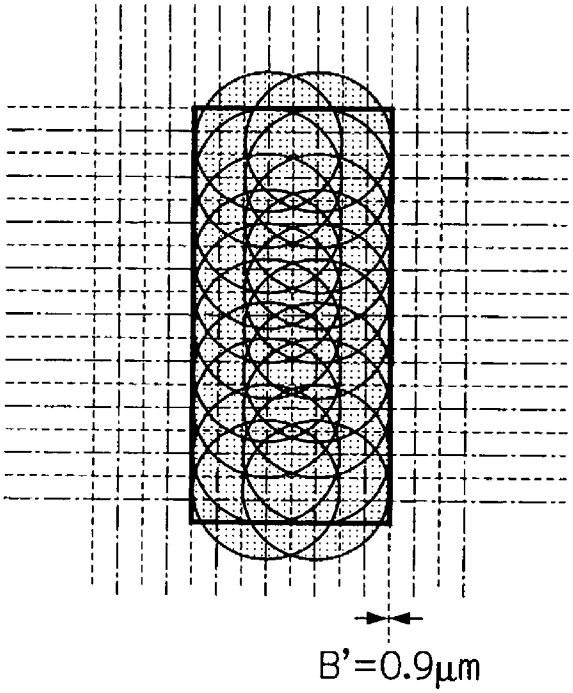

FIGS. 13A and 13B show examples of the droplet deposition arrangement in an image processing method according to the second embodiment.

In both FIGS. 13A and 13B, the resolution is 2400 dpi. The dot size (dot diameter) used is 25 μm in the case of FIG. 13A, and the dot size used is 30 μm in the case of FIG. 13B.

Furthermore, in both FIGS. 13A and 13B, a rectangle indicated by the solid lines indicates the ideal region, and similarly to the first embodiment described above, only the outline area on the right-hand side of the ideal region is discussed below. In both FIGS. 13A and 13B, no droplets are deposited onto the outline droplet deposition positions on the right-hand-most side of the ideal region (the right-hand-most intersection points between the alternate long and short dash lines within the ideal region), and droplets are deposited onto the droplet deposition positions located inward by one position from the outline droplet deposition positions. Therefore, FIG. 13A is the same as FIG. 6B.

Furthermore, supposing that droplets are deposited onto the outermost droplet deposition positions, then as shown in FIG. 6A, the distance (amount of divergence) A between the outermost perimeters of the deposited dots and the ideal outline position C would be 7.2 μm (i.e., A=7.2 μm), as described above.

Furthermore, if droplets are deposited onto the droplet deposition positions located inward by one position from the positions corresponding to outline area dots and droplets to form outline area dots are not deposited in a case where the dot size is 25 μm as shown in FIG. 13A, then the distance (amount of divergence) B between the outermost perimeters of these dots formed by depositing the droplets onto the positions located inward by one position and the ideal outline position C, would be 3.4 μm (B=3.4 μm), as shown in FIG. 6B.

On the other hand, in a case where the dot size is 30 μm as shown in FIG. 13B, if droplets to form outline area dots are not deposited, then the distance from the center of each of the adjacent deposition dots located inward by one position to the ideal outline position C is 15.9 μm, as stated previously. Furthermore, since the radius of the dot is 15 μm (=30 μm/2) in this case, the distance (amount of divergence) B' between the outermost perimeters of the dots formed by depositing the droplets onto the positions located inward by one position and the ideal outline position C is 0.9 μm (i.e., B'=15.9 μm−15 μm=0.9 μm).

Consequently, the amount of divergence A between the outermost perimeters of the deposited dots and the ideal outline position C is 7.2 μm (A=7.2 μm) when droplets are deposited onto positions up to the outline area to form dots. The amount of divergence B is 3.4 μm (B=3.4 μm) when the droplets are deposited onto positions located inward by one position to form dots having a dot size of 25 μm, without depositing droplets onto the outline area to form dots. The amount of divergence B' is 0.9 μm (B'=0.9 μm) when the droplets are deposited onto positions located inward by one position to form dots having a dot size of 30 μm, without depositing droplets onto the outline area to form dots. Hence, in this case, the droplet deposition arrangement shown in FIG. 13B based on a 30 μm dot size is selected, as it has the smallest amount of divergence from the ideal outline position C.

In the second embodiment, the image processing for selecting the droplet deposition arrangement in a case where the dot size is adjustable, is explained above with reference to a concrete example, and, the image processing is described further with reference to a flowchart.

The sequence of the image processing according to the second embodiment is substantially similar to that of the first embodiment shown in FIG. 8, and in the present embodiment, only the processing for determining the final droplet deposition data by performing outline compression processing in final step in FIG. 8, S130, is different. Therefore, only this processing for determining the final droplet deposition data by performing outline compression processing is described below.

Figure 14:
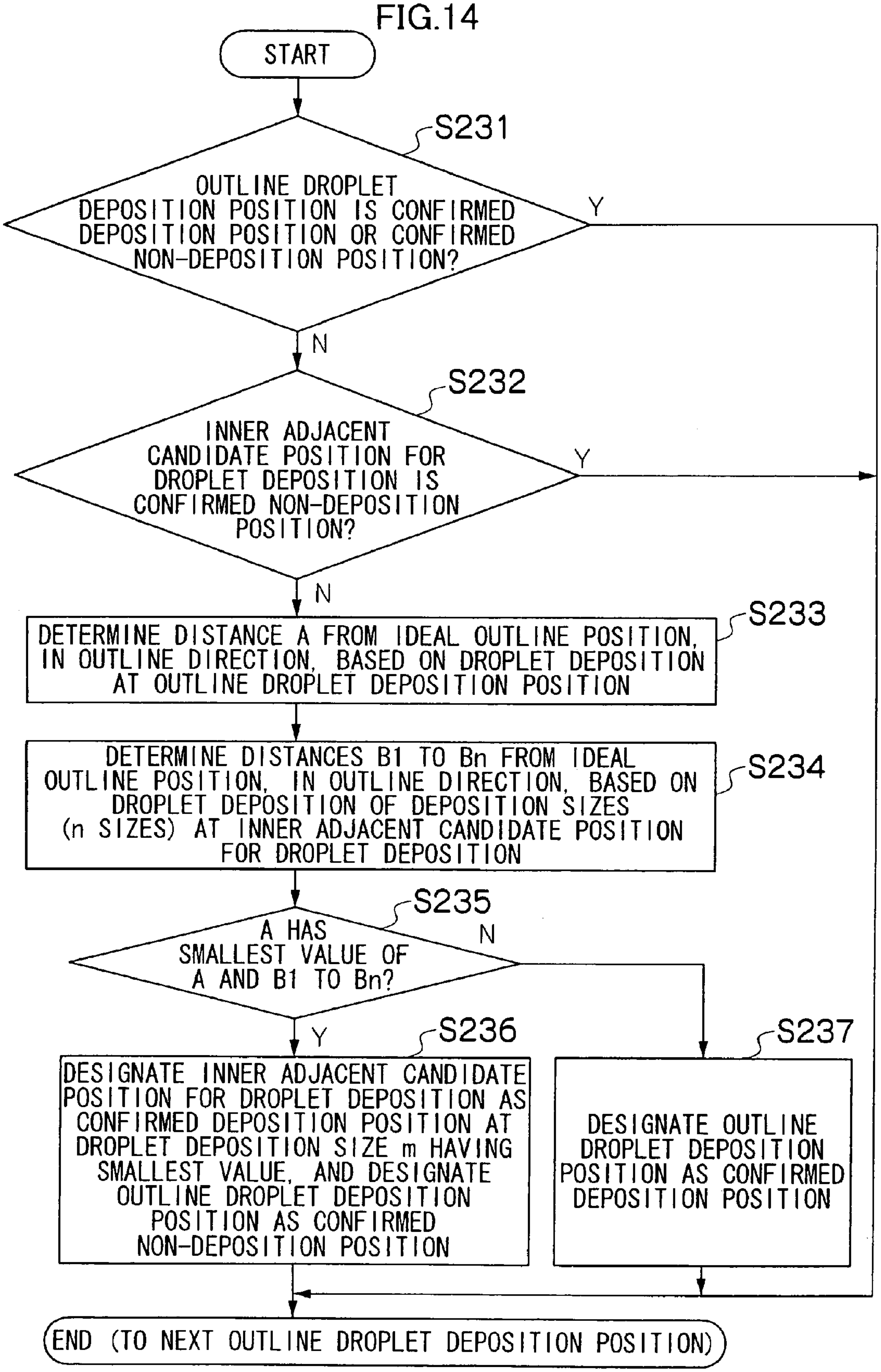
FIG. 14 is a flowchart showing a sequence of image processing according to the second embodiment.

FIG. 14 is a flowchart according to the present embodiment, showing the sequence of processing for determining the final droplet deposition data by performing the outline compression processing.

Firstly, at step S231 in FIG. 14, it is determined whether the outline droplet deposition position is a confirmed deposition position where it has already been confirmed that a dot is to be deposited or not, or whether it is a confirmed non-deposition position where it has been confirmed that a dot is not to be deposited or not. If it is established as a result of this that the position is one where deposition or non-deposition has been confirmed, then further processing is not required, and the processing is terminated and the procedure transfers to the processing for the next outline droplet deposition position.

If it has not yet been determined whether to deposit a droplet onto the outline droplet deposition position or not, then the procedure advances to the next step S232. At the step S232, it is determined whether the inner adjacent candidate position for droplet deposition with respect to that outline droplet deposition position is a confirmed non-deposition position or not. More specifically, it is determined whether it has already been established that a droplet is not to be deposited onto the position located inward by one position in the direction opposite to the outline direction with respect to the outline droplet deposition position or not. If, as a result of this determination, the inner adjacent candidate position for droplet deposition is a confirmed non-deposition position, that is, if it has already been established that no dot is to be deposited onto the inner adjacent candidate position for droplet deposition, then the processing terminates and the procedure transfers to the next outline droplet deposition position.

Furthermore, in the determination at step S232, if the inner adjacent candidate position for droplet deposition is not a confirmed non-deposition position, that is, if it has not yet been determined that no droplet is to be deposited onto the inner adjacent candidate position for droplet deposition to form a dot, then the procedure advances to the next step. At the next step, it is determined whether to deposit a dot onto the outline droplet deposition position or not, or whether to deposit a dot onto the inner adjacent candidate position for droplet deposition rather than the outline droplet deposition position or not. This corresponds to selecting the droplet deposition arrangement in either FIG. 13A or FIG. 13B (or the droplet deposition arrangement shown in FIG. 6A where droplets are also deposited onto the outline area).

At step S233, the distance (amount of divergence) A in the outline direction from the ideal outline position C according to droplet deposition onto the outline droplet deposition position, is determined. Furthermore, at step S234, distances (amounts of divergences) B1 to Bn from the ideal outline position C according to droplet deposition of a plurality of different dot sizes (n sizes) onto the inner adjacent candidate position for droplet deposition, are determined. In the examples shown in FIGS. 13A and 13B, the distances B (=B1) and B' (=B2) are determined with respect to two droplet deposition sizes, 25 μm and 30 μm.

Thereupon, at step S235, the amounts of divergence A, B1, . . . , and Bn are compared with each other, and it is determined whether A has the smallest value or not.

If, as a result of this, A does not have the smallest value, then this means that droplet deposition onto the inner adjacent candidate position for droplet deposition produces a smaller amount of divergence from the ideal outline position C. Therefore, in this case, at step S236, it is determined that no dot is to be deposited onto the outline droplet deposition position and the outline droplet deposition positions are designated as confirmed non-deposition positions. If the smallest value is Bm, for example, then droplet deposition onto the inner adjacent candidate position for droplet deposition is confirmed as the droplet deposition size m which produces the smallest value. In the case of the examples shown in FIGS. 13A and 13B, the droplet deposition arrangement based on a droplet deposition size of 30 μm shown in FIG. 13B is selected.

If, as a result of the comparison in step S235, the amount of divergence A is the smallest value, then at step S237, the outline droplet deposition position is designated as a confirmed deposition position in such a manner that a dot is deposited onto the outline droplet deposition position. This corresponds to selecting the droplet deposition arrangement shown in FIG. 7A.

In this way, if it is possible to deposit droplets to form dots of different sizes, then thickening of text characters or lines can be prevented even more effectively by selecting a droplet deposition arrangement on the basis of the dot size.

In the first embodiment and the second embodiment described above, in order to prevent thickening of text characters or lines, droplet deposition for forming outline area dots is not implemented under prescribed conditions, and the dots on immediately inward adjacent droplet deposition positions (inner adjacent candidate positions for droplet deposition) are substituted for those dots. In this case, if droplet deposition corresponding to the outline area dots is not performed when a recording width of a text character or line corresponds to one dot, then the shape can be disturbed. Hence, in such cases, the cancel of droplet deposition for outline area dots and their replacement with dots located on the inner side thereof, as described in the foregoing embodiment, is not applied.

Next, a third embodiment according to the present invention is described below.

In the third embodiment, if a dot projects significantly beyond the ideal outline position when a droplet is deposited onto the outline area, thereby causing thickening of a line, then a droplet is not deposited onto the outline area, and an optimal droplet deposition arrangement for preventing thickening of the line or text character is selected by checking the potential outcomes progressively in cases of droplet deposition positions from the outline area to the inner side one row by one position, in other words, by checking the outcome if a droplet is deposited onto the position located inward by one position (the inner adjacent candidate position for droplet deposition), the outcome if a droplet is deposited onto the next droplet deposition position located inward by one position further, the outcome if a droplet is deposited onto the next position located inward by one position further, and so on.

In this case, theoretically, there is no limit on the number of times to progress toward the inside. In order to simplify the description, a case where the determination operation progresses two times toward the inner side is described below.

Figure 15A:
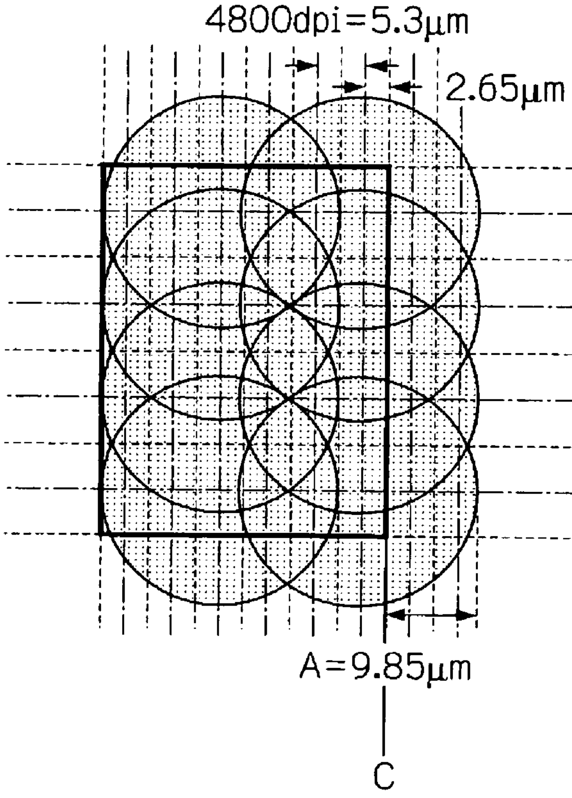
Figure 15B:
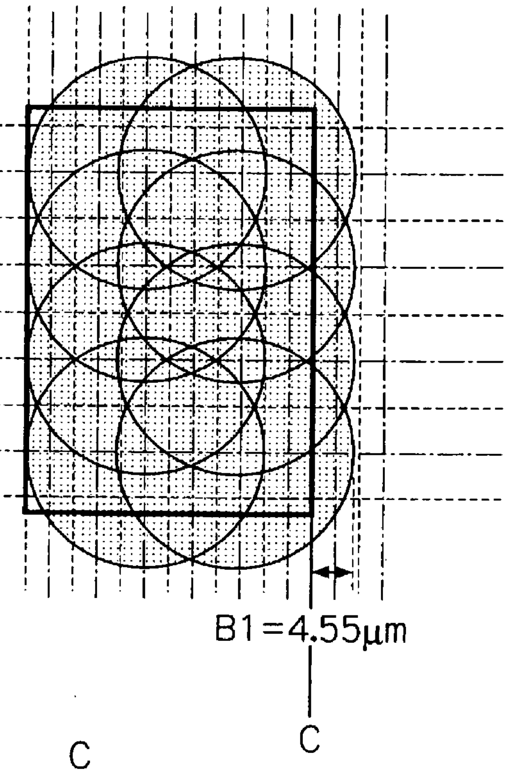
Figure 15C:
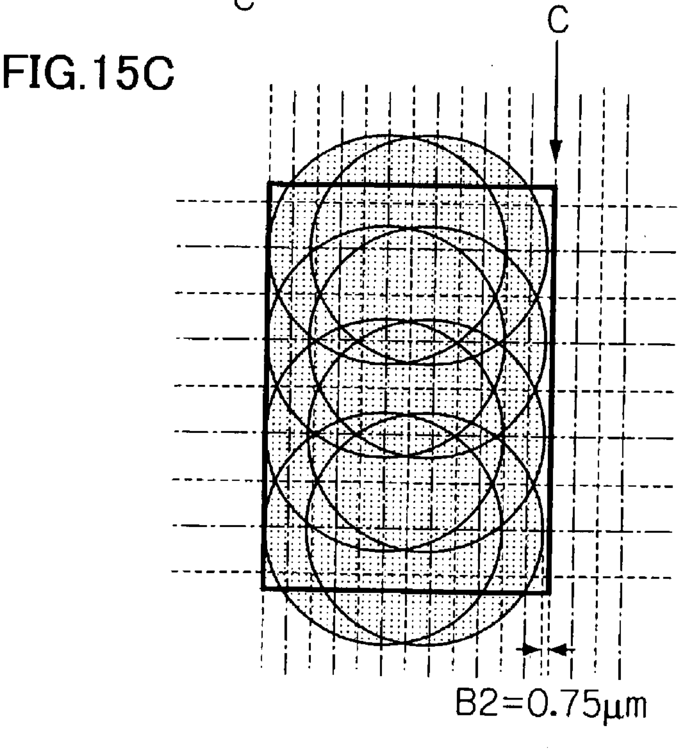

FIGS. 15A, 15B, and 15C show examples of the selection of a droplet deposition arrangement according to the present embodiment. Similarly to the preceding description, only the right-hand-side outline is discussed below.

In the examples shown in FIGS. 15A, 15B and 15C, the resolution is 4800 dpi×2400 dpi, and the dot size (dot diameter) is 25 μm. Furthermore, similarly to the foregoing description, the points of intersection of the alternate long and short dash lines indicate the possible droplet deposition positions. In FIGS. 15A, 15B, and 15C, in order to aid understanding, the diagrams are shown at a larger scale than the previous diagrams.

In FIG. 15A, droplets are deposited onto the right-hand-most positions of the outline area in the ideal region corresponding to the rectangle of solid lines. Since the resolution in the lateral direction is 4800 dpi, then the interval in the lateral direction between the alternate long and short dash lines is 5.3 μm (=25.4 mm (1 inch)/4800), and the distance from the center of a dot formed by depositing a droplet onto the outline area to the ideal outline position C is one-half of the interval of 5.3 μm between the alternate long and short dash lines, that is, 2.65 μm. Consequently, the distance (amount of divergence) A between the outermost perimeter of a dot deposited onto the outline area and the ideal outline position C is 9.85 μm (i.e., A=12.5 μm−2.65 μm=9.85 μm).

In FIG. 15B, no dots are deposited onto the outline area of the ideal region, and dots deposited onto the next possible droplet deposition positions located inward by one position are substituted for those droplets. In this case, the distance from the center of a dot formed by depositing a droplet onto the position located inward by one position, to the ideal outline position C, is 7.95 μm (=5.3 μm+2.65 μm), and the distance (amount of divergence) B1 between the outermost perimeter of this dot and the ideal outline position C, is 4.55 μm (i.e., B1=12.5 μm−7.95 μm=4.55 μm).

In FIG. 15C, rather than depositing droplets for outline area dots and depositing droplets onto the potential droplet deposition positions located inward by one position, dots formed by droplets deposited onto the potential droplet deposition positions located inward by one position are further substituted for those dots. In this case, the distance from the center of the dot formed by depositing a droplet onto the potential droplet deposition position located inward by two positions from the outline area, to the ideal outline position C, is 13.25 μm (=5.3 μm×2+2.65 μm), and the distance (amount of divergence) B2 between the outermost perimeter of this dot and the ideal outline position C, is 0.75 μm (i.e., B2=13.25 μm−12.5 μm=0.75 μm).

If the amounts of divergence of the three cases are compared with each other, namely, the amount of divergence A (=9.85 μm) when ink is ejected and outline area dots are formed, the amount of divergence B1 (=4.55 μm) when a droplet is deposited onto the positions located inward by one from the outline area to form a dot, and the amount of divergence B2 (=0.75 μm) when a droplet is deposited onto positions located inward by two from the outline area to form a dot, are compare with each other, then the relationship A>B1>B2 is obtained. In this case, since B2 is the smallest value, the droplet deposition arrangement in FIG. 15C corresponding to the divergence B2 is selected.

Thereby, the amount of divergence from the ideal outline position C becomes the smallest, and hence the thickening of the text character or line can be prevented effectively.

Figure 16:
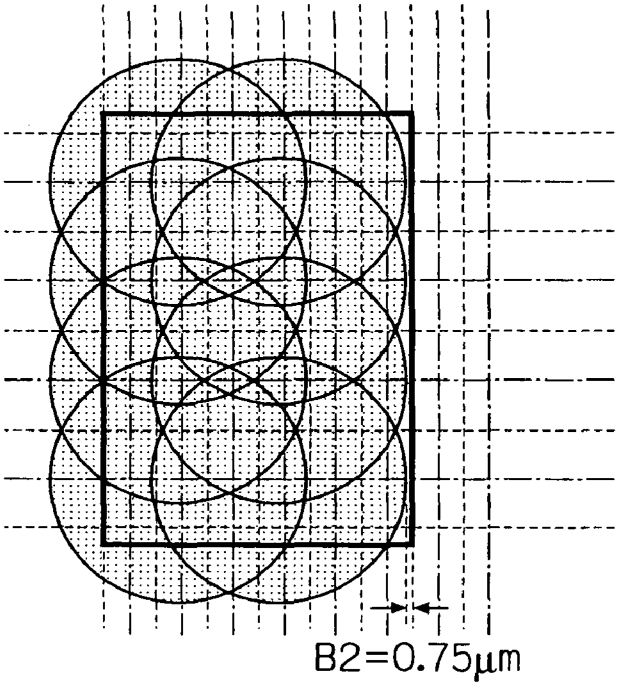
FIG. 16 is an illustrative diagram showing a modification example of the third embodiment.

As shown in FIG. 15C, because the droplets are deposited onto the potential droplet deposition positions located inward by two with respect to the outline area, there is a case where the droplet deposition distance between these droplets and the droplets deposited on the left-hand side becomes compressed. Therefore, there are possibilities that local concentrations of excessive amounts of ink may arise and ink bleeding or increased density may arise. In such cases, if it is not close to the left-hand side outline, then it is possible to adjust the droplet deposition position toward the inner side (toward the left-hand side), in such a manner that it is displaced toward the left by one potential droplet deposition position, as shown in FIG. 16, for example.

The sequence of the image processing according to the third embodiment is substantially similar to that in FIG. 8 according to the first embodiment shown; however, in the present embodiment, only the processing for determining the ultimate droplet deposition data by performing outline compression processing in the final step S130 in FIG. 8 is different. Hence, only this processing for determining the final droplet deposition data by performing outline compression processing is described below.

Figure 17:
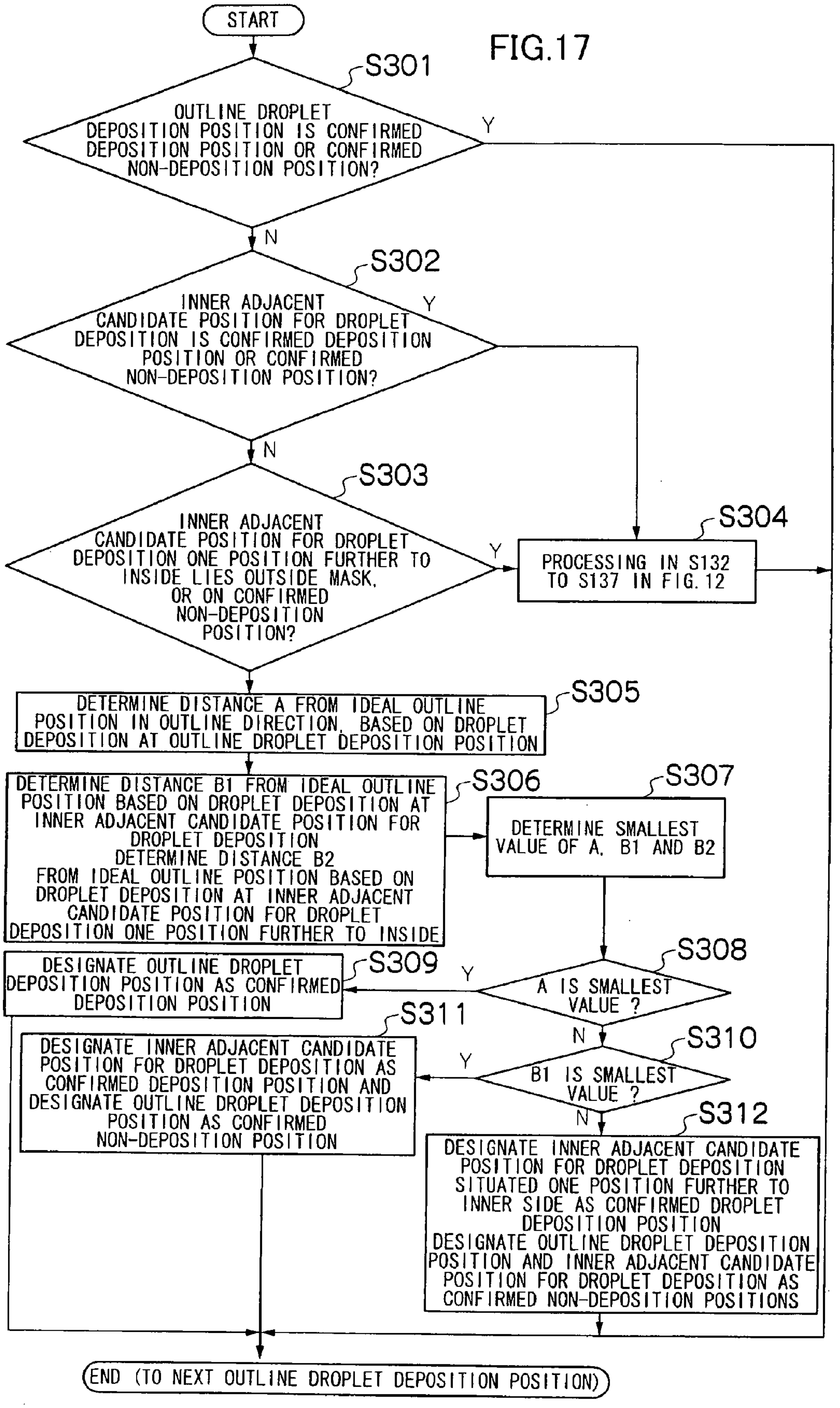
FIG. 17 is a flowchart showing a sequence of image processing according to the third embodiment.

FIG. 17 is a flowchart according to the present embodiment, showing the sequence of processing for determining the final droplet deposition data by performing the outline compression processing.

Firstly, at step S301 in FIG. 17, it is determined whether the outline droplet deposition position is a confirmed deposition position where it has already been confirmed that a droplet is to be deposited to form a dot or not, or whether it is a confirmed non-deposition position where it has been confirmed that a droplet is not to be deposited or not. If it is established as a result of this that the position is one where deposition or non-deposition has been confirmed, then further processing is not required, and therefore the processing is terminated and the procedure transfers to the processing for the next outline droplet deposition position.

If it has not yet been determined whether to deposit a droplet onto that outline droplet deposition position or not, then the procedure advances to the next step S302. At the step S302, it is determined whether the inner adjacent candidate position for droplet deposition corresponding to the outline droplet deposition position (the potential droplet deposition position located inward by one from the outline area) has been established as a confirmed deposition position or a confirmed non-deposition position or not.

If the position has not yet been established, then at the next step S303, it is determined whether the inner adjacent candidate position for droplet deposition located inward by one position further (the potential droplet deposition position located inward by two with respect to the outline area), are our of the mask or a confirmed non-deposition position or not.

If, in the determination at step S302, the inner adjacent candidate position for droplet deposition located inward by one from the outline area, is a confirmed deposition position or a confirmed non-deposition position, then the procedure advances to step S304. Moreover, if, in the determination at step S303, the inner adjacent candidate position for droplet deposition located inward by two from the outline area, is out of the mask or a confirmed non-deposition position, then the procedure advances to step S304. At the step S304, the processing at step S132 to the processing at step S137 in FIG. 12 according to the above-described first embodiment is implemented, whereupon the procedure transfers to processing of the next outline droplet deposition position.

If, on the other hand, the droplet deposition position located inward by one with respect to the outline area has not yet been established as a confirmed deposition position or a confirmed non-deposition position, and the droplet deposition position located inward by two with respect to the outline area is not out of the mask and is not designated as a confirmed non-deposition position, then the procedure advances to the following step. At the following step, processing is implemented for selecting which type of droplet to deposit, namely, whether to deposit a droplet to form an outline area dot, a dot onto a position located inward by one from the outline area, or a dot onto a position located inward by two from the outline area.

More specifically, firstly, at step S305, the distance (amount of divergence) A between the outermost perimeter of the formed dot and the ideal outline position C is determined for the case of a droplet deposited onto the outline droplet deposition position (an outline area dot), as shown in FIG. 15A.

Next, at step S306, as shown in FIG. 15B, the distance (amount of divergence) B1 between the outermost perimeter of a dot deposited onto the inner adjacent candidate position for droplet deposition (a dot deposited toward a position immediately adjacent to the outline area on the inner side) and the ideal outline position C, is determined. Moreover, the distance (amount of divergence) B2 between the outermost perimeter of a dot deposited onto an inner adjacent candidate position for droplet deposition which is located inward by one position further (a dot deposited onto a position located inward by two positions with respect to the outline area) and the ideal outline position C, is also determined.

At step S307, the three distances A, B1, and B2 thus determined are compared with each other, and the smallest value of the three is found. At the next step S308, if the smallest value has been determined to be A, then the procedure advances to step S309. At the step S309, it is determined that an outline area dot is to be formed and the outline droplet deposition position is designated as a confirmed deposition position. More specifically, the droplet deposition arrangement shown in FIG. 15A is selected.

Furthermore, if the smallest value is not A in the determination at step S308, then the procedure advances to the next step S310. At the step S310, it is determined whether the smallest value is B1 or not. If it is determined that the smallest value is B1, then the procedure advances to step S311. At the step S311, the inner adjacent candidate position for droplet deposition (a droplet deposition position immediately adjacent to the outline area on the inner side thereof) is designated as a confirmed deposition position, and the outline droplet deposition position is designated as a confirmed non-deposition position. More specifically, the droplet deposition arrangement shown in FIG. 15B is selected.

Furthermore, if, in the determination at step S310, the smallest value is not B1, then the procedure advances to step S312. At the step S312, the inner adjacent candidate position for droplet deposition located inward by one position further (a droplet deposition position situated two positions to the inner side from the outline area) is designated as a confirmed deposition position, while the outline droplet deposition position (outline area dot) and the inner adjacent candidate position for droplet deposition (the droplet deposition position located inward by one position with respect to the outline area) are designated as confirmed non-deposition positions. More specifically, the droplet deposition arrangement shown in FIG. 15C is selected.

Next, a fourth embodiment according to the present invention is described below.

In the present embodiment, vector data is transformed into raster data (bitmap data) in the image processing according to the droplet deposition size as well as the droplet deposition density.

Figure 18B:
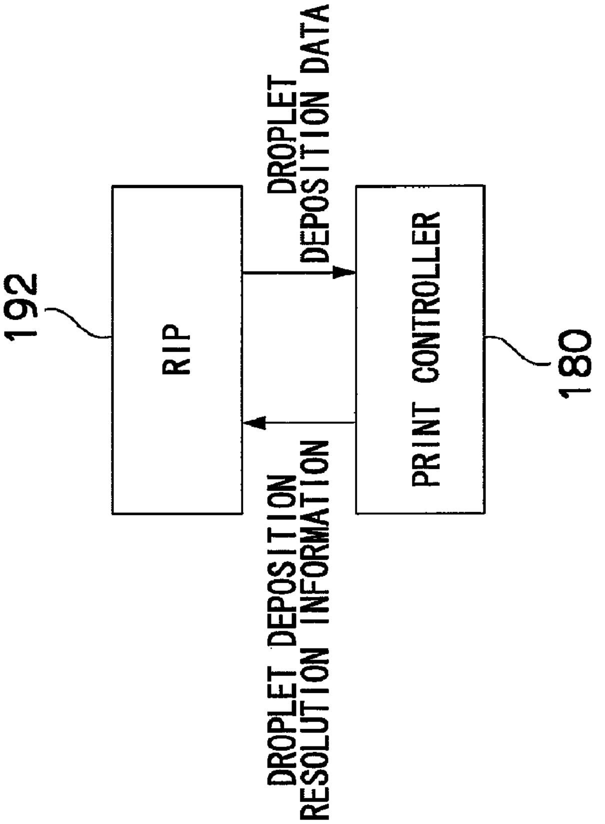
FIGS. 18A and 18B are block diagrams showing a conversion method in the related art shown for the purpose of comparison with a fourth embodiment of the present invention.
Figure 18A:
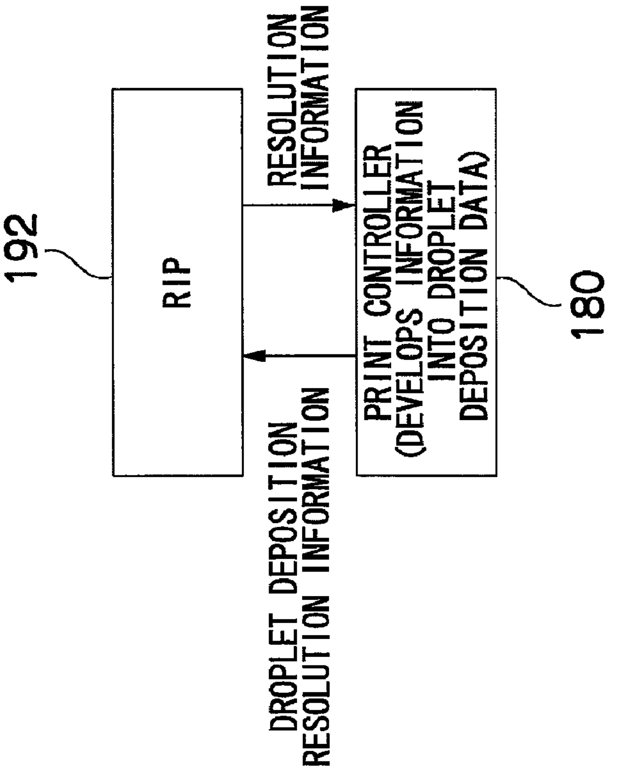

Firstly, a method in the related art will be described for the purpose of comparison with the present invention. FIGS. 18A and 18B show a method of image data conversion according to the method in the related art.

For example, as shown in FIG. 18A, droplet deposition resolution information (droplet deposition density information) is sent from a print controller 180 to a raster image processor (RIP) 192. In the RIP 192, the droplet deposition resolution information is transformed into resolution information, such as RGB density value data of 0 to 255, CMY grid percentage value data, or the like. After that, in the print controller 180, by performing half-tone processing to this data, this data is converted into bitmap data.

Alternatively, as shown in FIG. 18B, if the RIP 192 receives droplet deposition resolution information from the print controller 180, then the RIP 192 carries out half-tone processing, so that this information is converted into droplet deposition data. After that, the RIP 192 passes the droplet deposition data to the print controller 180. However, in either of these cases, the data is developed on the basis of only droplet deposition resolution information, and accordingly the development is not based on the dot size.

Figure 19:
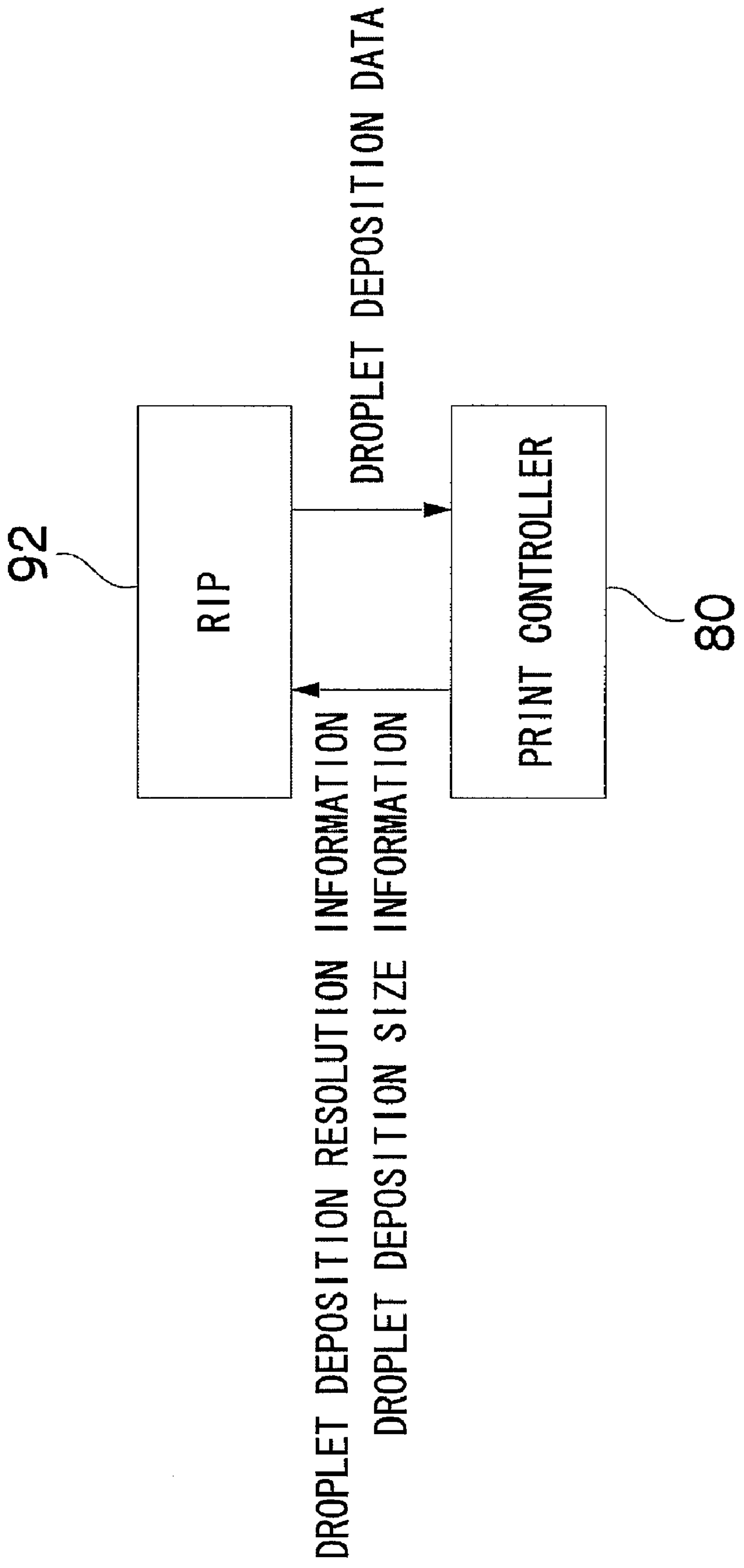
FIG. 19 is a block diagram showing an image processing method according to the fourth embodiment.

In contrast, in the present embodiment, as shown in FIG. 19, droplet deposition size information, in addition to droplet deposition resolution information, are transferred from the print controller 80 to the RIP 92. The RIP 92 converts the file based on Postscript into bitmap data (droplet deposition data) on the basis of both the droplet deposition resolution information, such as a dpi value that indicates the resolution, and the dot size. Incidentally, according to the Postscript, for instance, the image is handled as vector data including sets of points and curved lines linking these points.

In this case, the RIP 92 corresponds to the image processing unit 90 shown in FIG. 5. The print controller 80 functions as a device that obtains the dot size information and the recording resolution information. In addition, the print controller 80 and the RIP 92 form an image processing apparatus.

When a text character or line is to be recorded, for instance, on the basis of the dot size as well as the droplet deposition resolution information, if the recording positions (droplet deposition positions) are selected in such a manner that the recording width approaches the recording width indicated by the image information (the ideal outline position) according to the method described in any one of the foregoing embodiments, then it is possible to improve the quality of a very small text character or very fine line recorded at high density.

Figure 20:
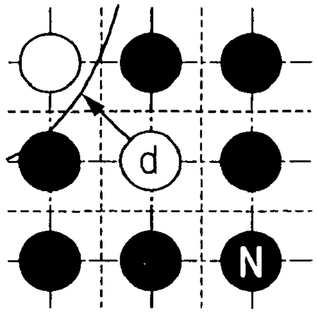
FIG. 20 is an illustrative diagram showing an outline calculation method according to the fourth embodiment.
Figure 21A:
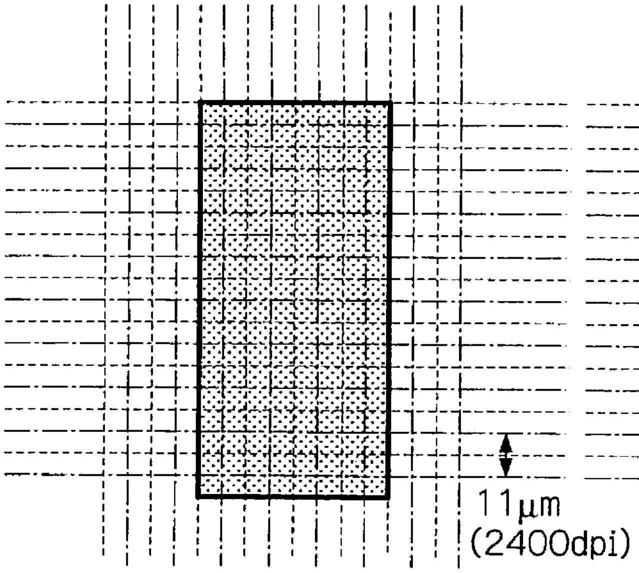
Figure 21B:
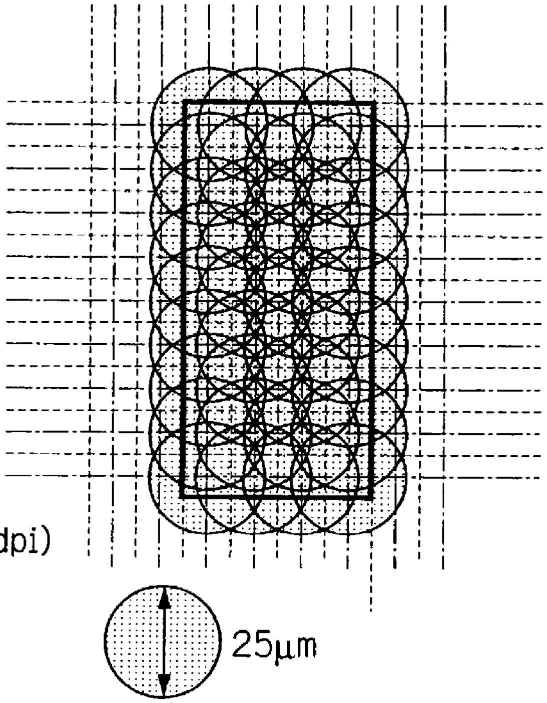
Figure 22A:
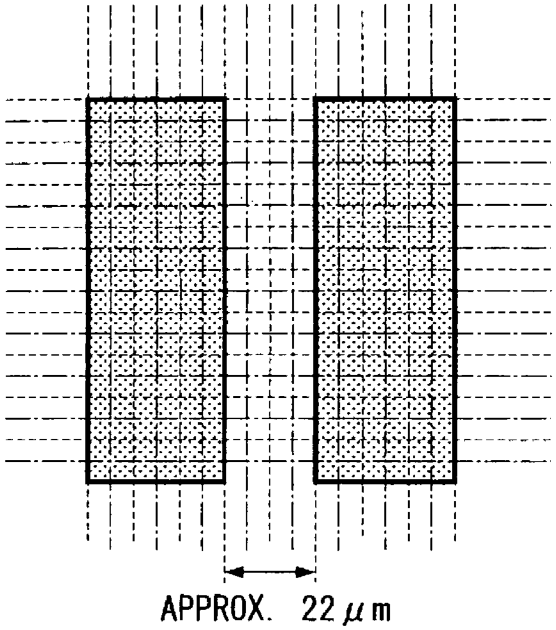
Figure 22B:
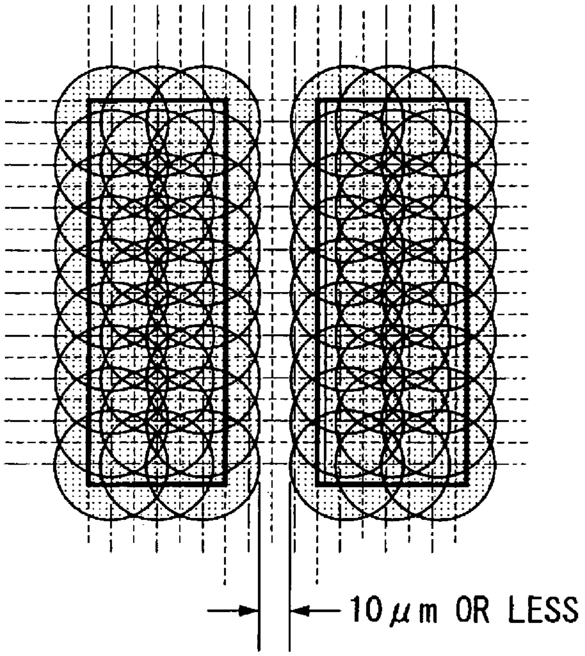

Specifically, the image data is stored as vector data in the form of curved line data (formulae), and can be the intermediate value. Accordingly, as shown in FIG. 20, for example, the distance to the ideal outline position C can be calculated as the distance to a position where the outline of the actual dot is represented by the curved line. By using this method to select the droplet deposition arrangement (including the dot sizes), it is possible to improve the quality of very small text characters, and the like, in high-density recording.

The image recording method and apparatus according to the present invention have been described in detail above; however, the present invention is not limited to the aforementioned embodiments. It is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method for an image recording apparatus which records an image by means of dots on a recording medium, the image processing method comprising the steps of:

setting the recording medium; and forming the dots on the recording medium; wherein:

dot size information relating to the dots that have at least one dot size and are recordable by the image recording apparatus, and recording resolution information are obtained;

when image information for a text character or line is transformed into bitmap data in accordance with which the image recording apparatus can record the image, then dot sizes and recording positions of the dots are determined in accordance with the dot size information and the recording resolution information, in such a manner that a recording width of the text character or line approaches a recording width determined in accordance with the image information.

2. The image processing method as defined in claim 1, wherein the at least one dot size are larger than a recording distance determined in accordance with the recording resolution information.

3. An image processing apparatus for an image recording apparatus that records an image on a recording medium by means of dots, the image processing apparatus comprising:

a device which obtains dot size information relating to the dots which have at least one dot size and are recordable by the image recording apparatus, and recording resolution information; and a device which determines dot sizes and recording positions of the dots in accordance with the dot size information and the recording resolution information, in such a manner that a recording width of a text character or line approaches a recording width determined in accordance with the image information, and transforms image information for the text character or line into bitmap data, the image recording apparatus being able to record the image in accordance with the bitmap data.

4. The image processing apparatus as defined in claim 3, wherein the at least one dot size are larger than a recording distance determined in accordance with the recording resolution information.

5. An image recording apparatus, comprising the image processing apparatus according to claim 3.

* * * * *